United States Patent [19]

Ergas et al.

[11] Patent Number: 5,745,392

[45] Date of Patent: Apr. 28, 1998

[54] METHOD FOR REDUCING DATA STORAGE AND TRANSMISSION REQUIREMENTS FOR SEISMIC DATA

[75] Inventors: Raymond A. Ergas, Laguna Beach, Calif.; Paul L. Donoho, Houston, Tex.; John Villasenor, Santa Monica, Calif.

[73] Assignee: Chevron U.S.A. Inc., La Habra, Calif.

[21] Appl. No.: 539,415

[22] Filed: Oct. 5, 1995

[51] Int. Cl.$^6$ ........................................................ G06F 7/00
[52] U.S. Cl. ..................................... 364/715.02; 364/421
[58] Field of Search ........................... 364/715.02, 421, 364/422

[56] References Cited

U.S. PATENT DOCUMENTS

| | | |
|---|---|---|
| 4,509,150 | 4/1985 | Davis . |
| 4,862,167 | 8/1989 | Copeland, III . |
| 4,872,012 | 10/1989 | Chabries . |
| 5,031,155 | 7/1991 | Hsu . |
| 5,047,991 | 9/1991 | Hsu . |
| 5,084,844 | 1/1992 | Wang . |
| 5,220,440 | 6/1993 | Hisatake . |
| 5,245,679 | 9/1993 | Rosenberg . |
| 5,251,184 | 10/1993 | Hildebrand et al. ............... 367/72 |
| 5,347,478 | 9/1994 | Suzuki et al. . |
| 5,347,494 | 9/1994 | Andersen ............................ 367/42 |
| 5,347,600 | 9/1994 | Barnsley et al. . |
| 5,379,036 | 1/1995 | Storer . |
| 5,396,595 | 3/1995 | Standley . |
| 5,414,425 | 5/1995 | Whiting et al. . |
| 5,432,871 | 7/1995 | Novik . |
| 5,524,100 | 6/1996 | Paffenholz ........................ 367/24 |

OTHER PUBLICATIONS

Bosman, Cheryl and Reiter, Edmund, *Seismic Data Compression Using Wavelet Transforms*, Exxon Production Research Co. (1993).

Luo, Yi and Schuster, G.T., *Wave Packet Transform and Data Compression*, University of Utah (1992).

Green, R.W.E., *Data Compression of Broad–Band Seismic Data Using a Portable PC*, Computers & Geosciences, vol. 19, No. 2, pp. 259–262 (1993).

Wood, Lawrence C., *Seismic Data Compression Methods*, Geophysics, vol. 39, No. 4, pp. 499–525 (Aug. 1974).

Spanias, Andreas S., Jonsson, Stefan B. and Stearns, Samuel D., *Transform Methods for Seismic Data Compression*, IEEE Transactions on Geoscience and Remote Sensing, vol. 29, No. 3 (May 1991).

Stearns, Samuel D., Tan, Li–Zhe and Magotra, Neeraj, *Lossless Compression of Waveform Data for Efficient Storage and Transmission*, IEEE Transactions on Geoscience and Remote Sensing, vol. 31, No. 3 (May 1993).

Eckstein, Miguel P., Morioka, Craig A., Whiting, James S. and Eigler, Neal, *Psychophysical evaluation of the effect of JPEG, Full–frame DCT and Wavelet image compression on signal detection in medical image noise*, in Press, SPIE Medical Imaging (1995).

(List continued on next page.)

*Primary Examiner*—Tan V. Mai
*Attorney, Agent, or Firm*—W. K. Turner; A. S. Zavell; J. S. Reid

[57] ABSTRACT

A method for compressing seismic data to reduce data storage and transmission requirements applies wavelet transforms to digitized trace sequential data obtained from plural arrays of multiple acoustic sensors. The wavelet transforms are applied in at least three dimensions, and, in the case of underwater exploration, four dimensions. The transformed data is ordered and quantized to increase the number of zero data values, and the quantized data is compressed using rim-length encoding and entropy coding. The entropy coded data is stored for later retrieval or transmitted to a remote location. The retrieved or received data is decompressed, dequantized and inverse wavelet transformed to construct a representation of the original data. The compression can be selected to be in excess of 100:1 to significantly reduce the data storage and transmission requirements without significant degradation of the reconstructed data.

19 Claims, 17 Drawing Sheets

OTHER PUBLICATIONS

Wickerhauser, M.V., *Adapted Wavelet Analysis From Theory To Software*, A.K. Peters, Wellesley, Massachusetts (1994).

Cosman, Pamela C. Gray, Robert M. and Olshen, Richard A., *Evaluating Quality of Compressed Medical Images: SNR, Subjective Rating and Diagnostic Accuracy*, Proceedings of the IEEE, vol. 82, No. 6 (Jun. 1994).

Shapiro, Jerome M., *Embedded Image Coding Using Zerotrees of Wavelet Coefficients*, IEEE Transactions on Signal Processing, vol. 41, No. 12 (Dec. 1993).

Starck, J.-L., and Murtagh, F., *Multiresolution Image Analysis using Wavelets—Recent Results*, Bulletin of the American Astronomical Society, 283, pp. 349–360 (1994).

Villasenor, John D., Belzer, Benjamin and Liao, Judy, *Wavelet Filter Evaluation for Image Compression*, Electrical Engineering Department, University of California, Los Angeles, IEEE Transactions on Image Processing, Manuscript No. IP–666 (1995).

Cody, Mac A., *The Wavelet Packet Transform*, Dr. Dobb's Journal (Apr. 1994).

Strang, Gilbert, *Wavelets and Dilation Equations: A Brief Introduction*, SIAM Review, vol. 31, No. 4, pp. 614–627 (Dec. 1989).

Epping, W.J.M. and L'Istelle, A.R., *Data Compression of Seismic Images by Neural Networks*, Revue de L'Institut Francais du Pétrole, vol. 47, No. 3 (May–Jun. 1992).

Baird, Jane, *Computerized Compression*, Houston Chronicle, vol. 94, No. 140 (Mar. 2, 1995).

Narum, Beverly, *Research team in The Woodlands develops new image compression software*, Houston Post, Business Section, p. 2 (Mar. 2, 1995).

Daubechies, Ingrid, *Ten Lectures on Wavelets*, Society for Industrial and Applied Mathematics, Philadelphia, Pennsylvania (1992).

Vetterli, Martin and Kovacevic, Jelena, *Wavelets and Subband Coding*, Prentice–Hall, ISBN 0–13–097080–B (1995).

Bradley, J. Brislawn, C., and Hopper, T., *WSQ Gray–Scale Fingerprint Image Compression Specification*, Federal Bureau of Investigation (1993).

Bradley, J. and Brislawn, C., *The FBI Wavelet/Scalar Quantization Standard for Grayscale Fingerprint Image Compression*, SPIE Proceedings, V. 1961, pp. 293–304 (1993).

Brislawn, Christopher M., *Classification of Symmetric Wavelet Transforms*, Los Alamos National Laboratory (1993).

FIG. 18a
FIG. 18b
FIG. 18c
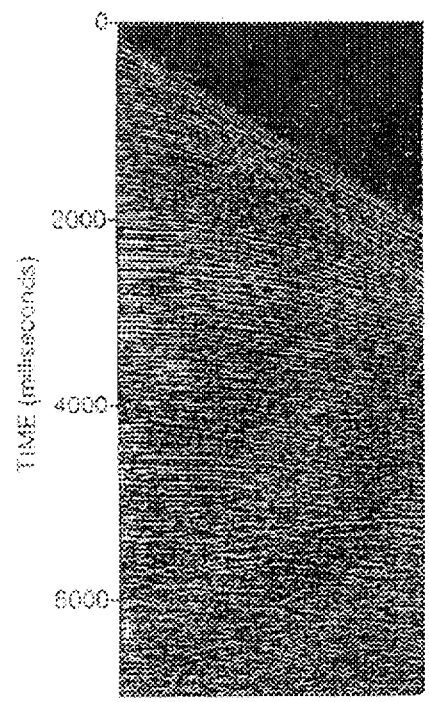
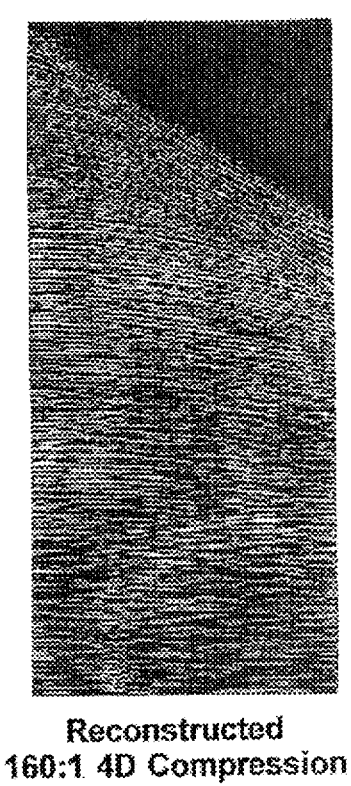
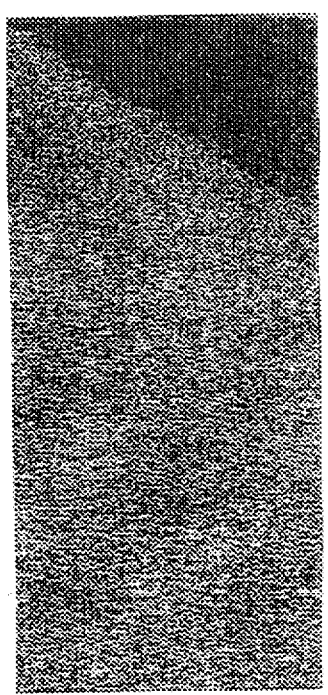
Original
Reconstructed
160:1 4D Compression
Difference

METHOD FOR REDUCING DATA STORAGE AND TRANSMISSION REQUIREMENTS FOR SEISMIC DATA

BACKGROUND OF THE INVENTION

1. Field of the Invention

This invention relates to the field of seismic exploration, and, more particularly, relates to a method whereby large quantities of digitized data resulting from such exploration can be compressed to reduce data storage and transmission requirements.

2. Description of the Related Art

It has been common for many years to perform seismic exploration for oil, gas, and other minerals. Typical techniques employed involve generation of an acoustic wave at the surface of the earth, including the surface of the ocean. This wave travels downwardly into the earth and is reflected from subterranean layers of rock of interest upwardly towards the surface of the earth where its return may be detected. Typically the detectors output analog electrical signals which are converted to digital form and are recorded. Analysis of the recorded signals can then be performed and used to yield a picture of the subterranean structure of the earth which can be interpreted by geophysicists in the search for oil, gas, and other valuable minerals.

As part of the expansion of this field, it is desirable to generate better and better pictures which in turn requires the recordation of more and more digital data. The current emphasis on three-dimensional seismic data acquisition has led to the generation of data sets capable of taxing the storage and input/output capacities of the largest supercomputers. At the present time, a typical shipboard exploration system involves recordation of samples from 1440 discrete groups of hydrophones comprising a sampling apparatus which may extend two to four kilometers behind a ship. To store the recorded data collected from a single, 1,000 square kilometer mapping mission (a data set), approximately 5,000 magnetic tapes are required with each tape having 200 megabytes (200,000,000 bytes) of capacity. The trend toward distributed, networked computing environments has exacerbated most problems of dealing with data sets which can approach or even exceed terabyte ($10^{12}$ bytes) levels. Clearly, it would be desirable to reduce the amount of data to be stored, if this could be accomplished without loss of accuracy.

A further impetus for the development of useful data compression schemes is that it is desirable, for example, that the data be transmitted from an ocean-going exploration vessel to a home base computer for analysis, while the ocean-going vessel is still in the area of exploration. In this way, if the data is of particular interest, or if for some reason was improperly recorded requiring re-exploration, the ship can return to the area of exploration without having to sail an excessive distance. However, to transmit full digital representations of the seismic data recorded as mentioned above is prohibitively expensive using present day transmission facilities, a situation which is not likely to improve. This is therefore another area in which compression of seismic data could be of use.

Despite the rapid increase in available disk storage at ever lower cost, management of large data sets remains a formidable problem. Not only is it prohibitively expensive to transmit full digital representations of the seismic data recorded as mentioned above, the thousands of physical magnetic tapes required to be mounted and unmounted in proper sequence on tape-reading machines introduces great probability for operator error, as does the prospect of storing such a data set across multiple disk storage devices. This potential for operator error attends any use of an entire seismic data set comprising thousands of tapes. Substantial compression of recorded seismic data will facilitate the storage of an entire seismic data set on physically fewer magnetic tapes. An additional advantage of compressing seismic data is the decreased probability of operator error resulting from fewer storage devices.

Finally, substantial compression of recorded seismic data will reduce the cost associated with archival storage. A reduction in the number of magnetic tapes required to hold each data set will reduce the cubic feet of climate-controlled environment required to house the magnetic tapes. Also, fewer tapes and less time will be required to perform periodic transfers of archived tapes to new tapes.

The benefits of substantial compression of recorded seismic data are clear. A data compression technology which can provide a compression ratio of at least 100:1 reduces a terabyte-sized data set to a manageable 10 gigabytes ($10^{10}$ bytes). Such data compression reduces the number of magnetic tapes required to store a data set by a factor of 100 and permits network-based transmission of a data set in minutes rather than hours. It is, however, impossible to attain such a large compression ratio without introducing a certain degree of noise into the data set.

Perfectly noiseless compression algorithms applied to seismic data can achieve compression ratios no greater than a factor of about 2:1. It is possible, nevertheless, to devise a so-called lossy compression algorithm capable of large compression ratios at the expense of introducing noise into the data set. A principal goal of such an algorithm is to constrain the algorithm-induced noise so as to minimize or eliminate the loss of geophysically significant information in the data set.

Lossy compression schemes have been employed for some time for still photographic images, leading, for example, to the JPEG standard (See, for example, G. K. Wallace, "The JPEG Still Picture Compression Standard," *Communications of the ACM*, Vol. 34, pp. 31–44, 1990), which is now widely used. But JPEG introduces artifacts even at low compression ratios that would be totally unacceptable for seismic data.

Most of the lossy data-compression algorithms reported in the literature follow a common approach: the data are mathematically transformed to a new representation in which they are better organized for data-compression procedures than in the normal spatial-temporal domain. Most geophysicists are quite familiar with the use of the Fourier transform to reorganize data to facilitate a particular objective. The f-k transform is a prime example.

More recently, the wavelet transform, a relatively new mathematical concept, has been employed to develop data-compression algorithms for many purposes, with noise characteristics superior to those of JPEG and other similar compression methods. (See, for example, Ingrid Daubechies, "Ten Lectures on Wavelets," Rutgers University and AT&T Bell Labs., Society for Industrial and Applied Mathematics, 1992). Results for seismic data sets have been reported earlier. (See, for example, Cheryl Bosman and Edmund Reiter, "Seismic Data Compression Using Wavelet Transforms," presented at the 63rd Ann. Internat. Mtg. Soc. Expl. Geophys., 1993; Y. Luo and G. T. Schuster, "Wave Packet Transform And Data Compression," presented at the 62nd Ann. Internat. Mtg. Soc. Expl. Geophys., 1992; E. C. Reiter and P. N. Heller, "Wavelet Transformation-Based Compression Of NMO-Corrected CDP Gathers," presented at the 64th Ann. Internat. Mtg. Soc. Expl. Geophys., 1994).

The wavelet transform organizes data into subbands, each of which exhibits a different scale of temporal and spatial frequency characteristics. (See, for example, the above-cited "Ten Lectures on Wavelets" by Daubechies. See, also, M. V. Wickerhauser, "Adapted Wavelet Analysis From Theory To Software," A. K. Peters, Wellesley, Massachusetts, 1994; and Martin Vetterli and Jelena Kovacevic, "Wavelets and Subband Coding," Prentice-Hall, 1995, ISBN 0-13-097080-B). For example, the largest subbands consist of high-frequency data in temporal and all spatial dimensions. Because of the coherency of the data along the spatial dimensions, virtually all of the data in this subband represent noise of no geophysical significance. Many of the subbands at lower frequencies contain the important information that must not be contaminated with significant noise. But these important subbands contain far fewer data samples.

Wavelet transforms have been used to compress seismic data. (See, for example, the above-cited "Seismic Data Compression Using Wavelet Transforms," by Bosman and Reiter, 1993). Compression ratios ranging between 2:5:1 and 50:1 have been reported using wavelet transform-based compression processes with minimal levels of degradation.

SUMMARY OF THE INVENTION

The present invention discloses a wavelet-transform based compression algorithm capable of attaining compression ratios greater than 100:1 (0.32 bits per sample) for both pre-stack and post-stack seismic data, with the introduction of negligible noise, leading to no apparent loss of geophysical information in the final uncompressed data set. There are three primary steps to the compression process disclosed herein: (1) multidimensional application of an invertible discrete wavelet transform to represent a recorded seismic data set by its wavelet coefficients and to order the data according to separable subbands; (2) scalar (integer) quantization of the wavelet coefficients by allocating a minimum number of bits to represent data within each subband according to the concentration of geophysically interesting data in the subband; and (3) lossless compression of the quantized wavelet coefficients into a compressed bit stream representation of the seismic data set. The decompression component of the present invention involves a reversal of the compression steps: (1) decompression of the compressed bit stream representation of a seismic data set to reconstruct the integer representation of quantized wave, let coefficients; (2) dequantization of integer data to reconstruct approximate floating point representations of wavelet coefficients in the seismic data set; and (3) inverse multidimensional wavelet transform of the wavelet coefficients in the seismic data set to reconstruct a representation of the original, digitized, floating point seismic data set.

One aspect of the present invention is a method for reducing data storage requirements or transmission requirements for a set of seismic data collected from a plurality of seismic sensors in response to at least one seismic shot. Each sensor generates time-varying data which is sampled, digitized and stored. The data from the plurality of sensors have a spatial relationship therebetween in at least two spatial dimensions. The method comprises the steps of applying a wavelet transform to the time-varying data in at least first, second and third dimensions to generate subbands of transformed data comprising wavelet coefficients which represent the time-varying data and which are organized in accordance with frequency characteristics. One of the first, second and third dimensions corresponds to time, another of the first, second and third dimensions corresponds to the first spatial dimension, and the last of the first, second and third dimensions corresponds to the second spatial dimension.

The method further includes the step of scalar quantizing the subbands of wavelet coefficients. The wavelet coefficients are replaced by integer equivalents. Each integer equivalent represents a range of values for the wavelet coefficients. The integer equivalents selected for each subband are based upon the relative geophysical significance of each subband. The less significant subbands have fewer ranges and the more significant subbands have more ranges. The method further includes the steps of compressing the replacement integer equivalents to generate a compressed data set. The compressed data set is then transmitted or stored.

Preferably, the wavelet transform is further applied in a fourth dimension. In one embodiment, the fourth dimension corresponds to a third spatial dimension resulting from further seismic shots spatially displaced from previous seismic shots. Also preferably, the scalar quantizing step comprises the steps of: (1) reordering the transformed data in the subbands so that data in the same subbands are accessed sequentially; (2) computing the RMS value of data in the transformed data set; (3) selecting a master step size proportional to said RMS value such that a desired compression ratio is obtained; (4) selecting a step size for each subband by applying a respective weight for each subband to the master step size to determine the number of bits to use for each subband; (5) adjusting the step size for each subband such that the maximum value in each subband corresponds to the maximum value represented by the number of bits selected for each subband; (6) adjusting the step size of data represented by a zero value for each subband such that subbands containing more geophysically significant data have a smaller range of values represented by a zero value and subbands containing less geophysically significant data halve a larger range of values represented by a zero value; and (7) converting each value in each subband to an integer value using the step sizes for each subband. In one embodiment, the compressing step comprises the steps of applying run-length encoding to the replacement integer values to generate a set of run-length encoded data, and applying entropy coding to the set of run-length encoded data to generate the compressed data set.

Another aspect of the present invention is a method for reconstructing a set of seismic data from a compressed data set comprising the steps of:: (1) retrieving a compressed data set resulting from applying wavelet transformation, scalar quantization, and compression to a set of seismic data generated in response to at least one seismic shot; (2) decompressing the compressed data set to create an uncompressed data set; (3) scalar dequantizing the uncompressed data set to generate a set of wavelet coefficients in trace sequential order which approximate an original set of wavelet transformed seismic data; and (4) applying an inverse wavelet transform in at least three dimensions to the set of wavelet coefficients to generate reconstructed seismic data. Preferably the decompression step comprises the steps of applying entropy decoding to the compressed data set and next applying run-length decoding to generate an uncompressed data set. Also preferably, the scalar dequantizing step comprises the steps of replacing integer values in the uncompressed data set with floating point values to generate a wavelet transformed data set of wavelet coefficients approximating an original seismic data set; and ordering the wavelet transformed data to create a trace sequentially ordered data set. Also preferably, the inverse wavelet transform is applied in a fourth dimension. In one embodiment, the fourth dimension corresponds to a third spatial dimension resulting from further seismic shots spatially displaced from previous seismic shots.

Yet another aspect of the present invention is a compressed data set generated by first applying a wavelet transform to a set of digital data representing seismic data in first, second and third dimensions to generate subbands of transformed data comprising wavelet coefficients. The wavelet coefficients represent the seismic data and which are organized in accordance with frequency characteristics, wherein one of the first, second and third dimensions corresponds to time. Another of the first, second and third dimensions corresponds to a first spatial dimension. The last of the first, second and third dimensions corresponds to a second spatial dimension. Thereafter, the subbands of wavelet coefficients are scalar quantized by replacing the wavelet coefficients by integer equivalents which represent a range of values for the wavelet coefficients. The integer equivalents are selected for each subband based upon the relative geophysical significance of each subband. Less significant subbands have fewer ranges and more significant subbands have more ranges. The replacement integer equivalents are then compressed to generate a compressed data set.

BRIEF DESCRIPTION OF THE DRAWINGS

The present invention will be described below in connection with the accompanying drawing figures in which:

FIG. 16 illustrates a pictorial representation of the subband re-ordering of the data in the subbands into contiguous logical storage locations.

FIG. 18 illustrates a pictorial representation of seismic trace data before and after the application of the present invention and also a pictorial representation of the distribution of the differences in the seismic trace data due to application of the present invention.

DETAILED DESCRIPTION OF THE PREFERRED EMBODIMENT

Figure 1:
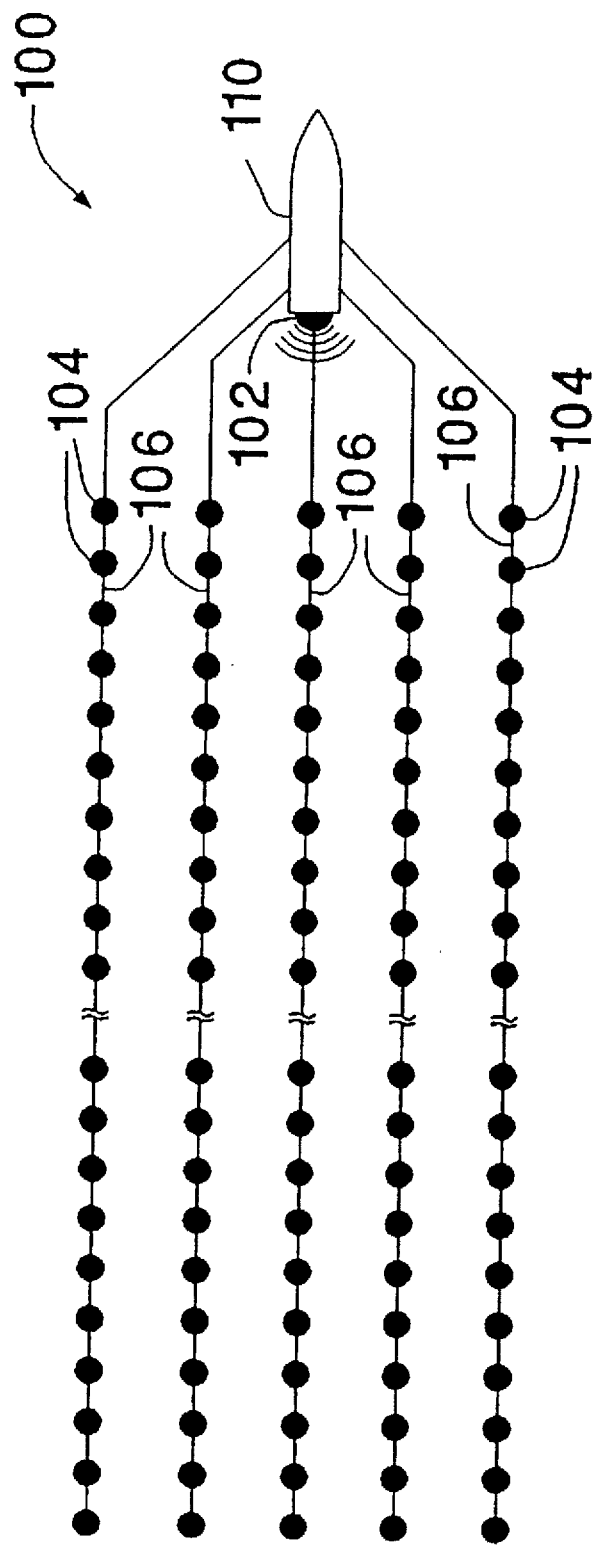
FIG. 1 illustrates a representation of an overall view of a seismic exploration system which may generate data which can be compressed in accordance with the invention.

FIG. 1 illustrates a representation of an overall view of a seismic exploration system 100 which may generate data which can be compressed in accordance with the invention. The seismic exploration system comprises a plurality of attached sources 102 of acoustic energy, such as compressed air guns, which are controlled to emit acoustic waves downwardly. Such acoustic waves emanate downward through ocean water, through the ocean floor, and through sub-sea geographical layers. "Reflection events" occur when portions of such acoustic waves are reflected upward toward the ocean surface upon contacting particular geological structures and subterranean layers. As indicated in FIG. 1, a plurality of hydrophone groups 104 may be arranged along a plurality of streamer cables 106 trailing behind a moving exploratory vessel 110 to detect reflection events.

Figure 2:
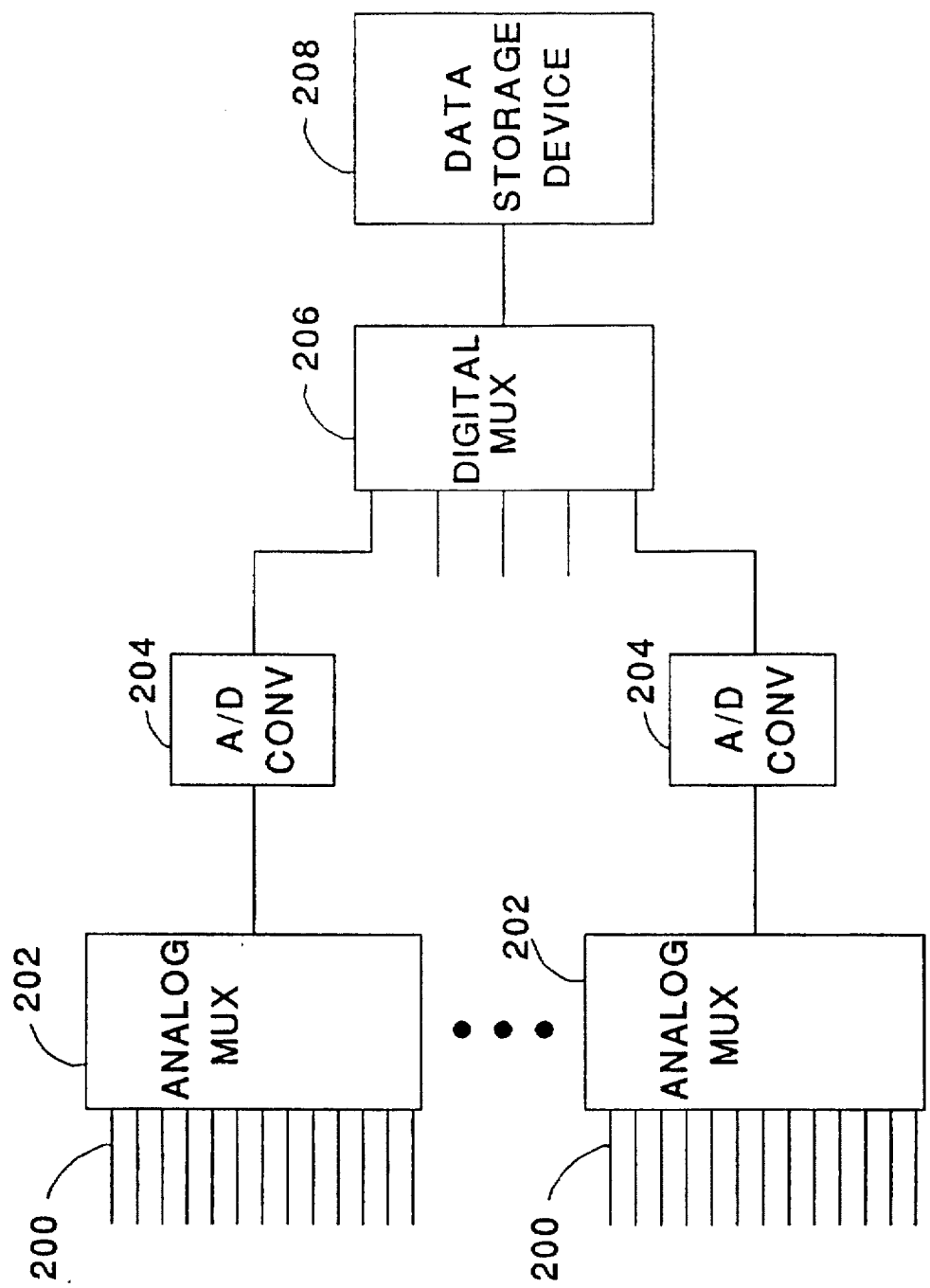
FIG. 2 illustrates a schematic block diagram of an exemplary data gathering system which receives and stores the data generated by the exploration system of FIG. 1.

FIG. 2 illustrates analog signals 200 originating from hydrophone sources which are then multiplexed and input into analog-to-digital converters (A/D-Con) 202 for each streamer 106. The digital output from the analog-to-digital converter 202 are multiplexed 206 and then stored on a digital storage device 208. Conventional data processing equipment (not shown) associated with seismic exploration systems can receive signals generated by hydrophones or geophones in response to detected waves, convert the analog signals into digital form, and then store or transmit the digital data.

Although illustrated in FIG. 1 as an ocean-going seismic exploration system, it will be readily apparent to one skilled in the art that the present invention is applicable to land-based seismic exploration. Furthermore, although described herein with respect to newly gathered data, the present invention has significant applicability to previously gathered data. As noted above, seismic data collected from a single mission to render a three-dimensional mapping of particular terrain (a "seismic data set") can be quite voluminous, often requiring more than a terabyte ($10^{12}$ bytes) to store in noncompressed form.

It will be readily appreciated by one skilled in the art that the voluminous nature of a seismic data set differs little whether its origin was land-based, sea-based, or whether it was retrieved from archival storage. Regardless of the source of a seismic data set, the data compression in accordance with the present invention can be used to reduce data storage requirements by a factor of 100 (e.g., a compression ratio of 100:1) or more. For example, the present invention can be used to transfer data from a multiplicity of data storage tapes to substantially fewer tapes.

Figure 3:
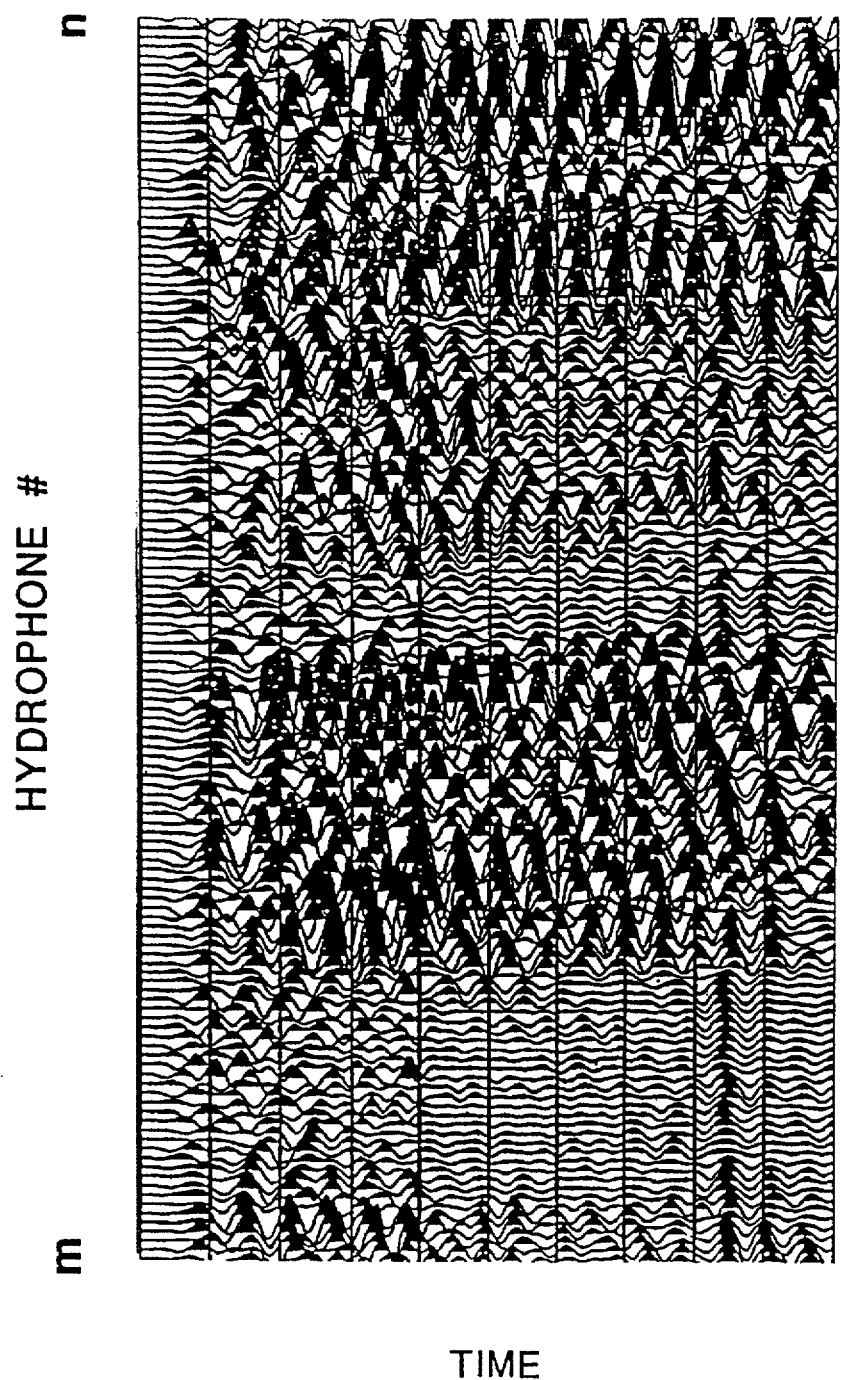
FIG. 3 illustrates a representation of a portion of the seismic data gathered by one shot on one streamer of the exploration system of FIG. 1.

FIG. 3 illustrates approximately one half of the seismic traces generated by 288 separate hydrophone groups located along one streamer cable 300 (see FIG. 1) in response to detected reflections of an acoustic wave produced at the surface (a "shot"). FIG. 3 illustrates approximately one second of the waveform data generated by each hydrophone group (numbered m through n across the X-axis) over time (along the Y axis). It should be understood that there are additional traces to the left and to the right of the traces shown in FIG. 3, and that the duration of each trace is substantially longer than shown.

In a conventional exploratory mission, the hydrophone groups along one streamer cable are located at 12.5 meter displacements. That is to say that the center of each hydrophone group along a streamer cable is 12.5 meters distant from the center of the adjacent hydrophone group. It will be appreciated by one skilled in the art that, in response to a single shot, a plurality of hydrophone groups arranged in linear fashion at 12.5 meter increments along a single streamer cable can generate planar data which relate along two dimensions: a time dimension and a spatial dimension.

Figure 4:
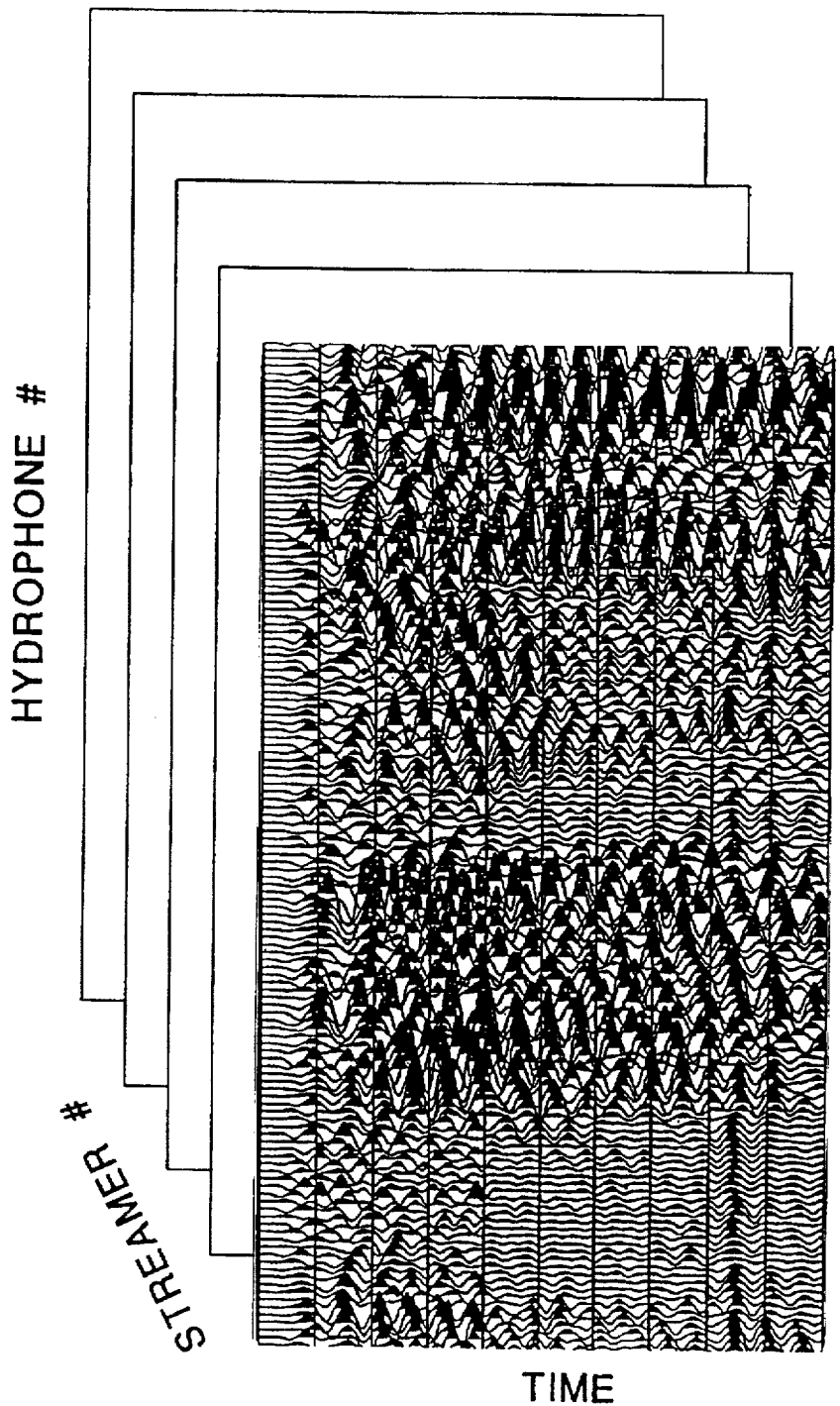
FIG. 4 illustrates a pictorial relationship between the seismic data gathered by multiple streamers of the exploration system of FIG. 1.

FIG. 4 illustrates a portion of the signals generated by five separate streamers in response to a single shot, with each streamer carrying 288 equally-spaced hydrophone groups. One skilled in the art will appreciate that data resulting from such recorded signals can generate five planar representations (one plane for each streamer), resulting in data which relate along three dimensions: a time dimension and two spatial dimensions.

Figure 5:
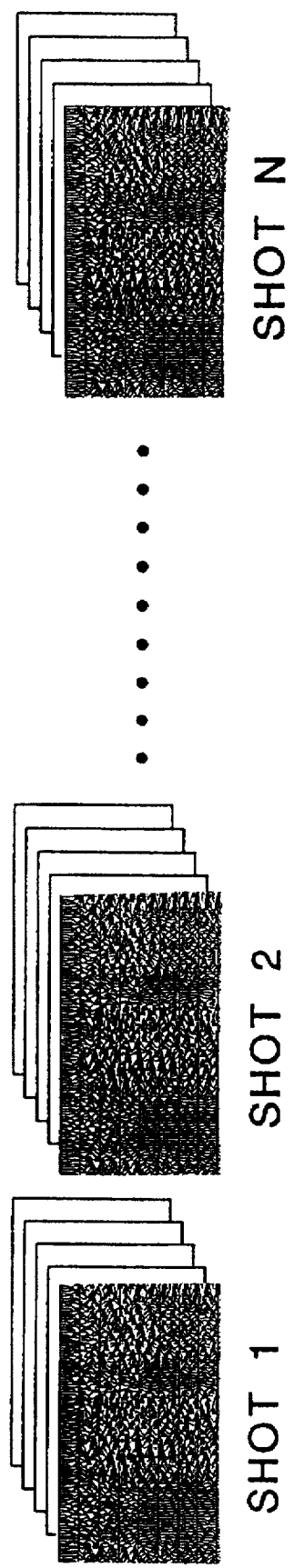
FIG. 5 illustrates pictorial representation of the seismic data gathered by multiple streamers and multiple shots by the exploration system of FIG. 1.

FIG. 5 illustrates a portion of the signals generated by five separate streamers in response to a plurality of shots, with each streamer carrying 288 equally-spaced hydrophones. Between each shot, the exploratory vessel transports the entire apparatus of streamer cables and hydrophones a distance of 25 meters relative to a fixed location on the ocean floor. The exploratory vessel travels in an approximate straight line for approximately 10 seconds between each shot. It will be appreciated by one skilled in the art that data resulting from the recordation of such signals over a series of shots can generate a multiplicity of 5-plane representations, such that data within each 5-plane representation relate along three dimensions (a time dimension and two spatial dimensions) and data from adjacent 5-plane representations relate along the same three dimensions but reflect a 10-second shift along the time dimension and a 25 meter shift along one spatial dimension. One skilled in the art will appreciate that relationships of interest can and often do exist between discrete sets of data sampled at differing times and locations. It will also be appreciated that a representation of subterranean structures and layers occupying many square kilometers can be constructed by analyzing the data obtained from the exploratory vessel which performs hundreds of adjacent, approximately parallel, recording runs where each recording run comprises the recordation of reflective signals emanating from many hundreds of shots. Such analysis of the seismic data is not within the scope of the present invention and will not be discussed herein.

Figure 6:
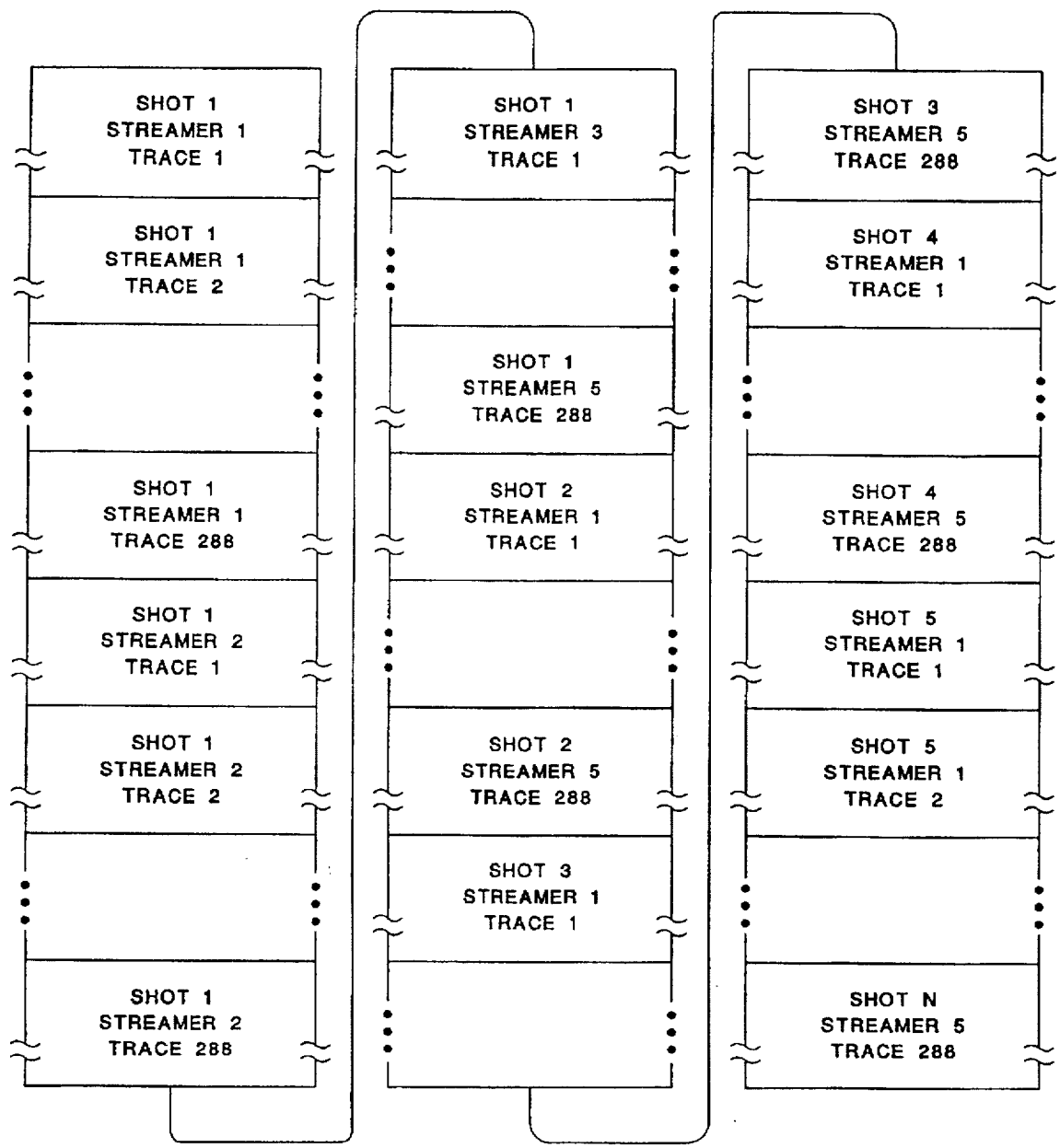
FIG. 6 illustrates a pictorial representation of the floating point data stored in trace sequential order in the data storage system of FIG. 5.

FIG. 6 illustrates a "trace sequential" ordering for recorded seismic data. As mentioned above, a single seismic data set comprises a vast amount of data-literally billions of 32-bit floating point numbers. To extract geophysical meaning from these data, it is necessary to understand for each individual datum 1) the time it was recorded relative to the other data and 2) from which hydrophone group it originated.

Trace sequential ordering provides a method for ordering data such that the relative recording time and hydrophone group for any datum can be calculated based solely on the sequential position of the datum within a single continuous sequence of 32-bit floating point numbers comprising the entire data set.

For each shot produced at the ocean surface, each hydrophone group will detect reflected acoustic waves for a predetermined recording time of 5 seconds, for example. The signals generated by one hydrophone group during the predetermined recording time are collectively referred to as a "trace." As depicted in FIG. 6, seismic signals generated for one shot will be organized into discrete traces 600. The traces are ordered by hydrophone group number (from 1 to 288 along each streamer) 602 and streamer cable number (from 1 to 5) 604.

Data generated for shot number 1 (the shot first in time) will be arranged into trace sequential order by first identifying the data originating from hydrophone group number 1 along streamer cable number 1. The 32-bit floating point numbers comprising this first identified trace will be recorded (sequenced) in temporal order, earliest to latest. One skilled in the art will appreciate that because the precise sampling time period is predetermined, the number of such floating point numbers in any trace is fixed. Next, a trace 606 originating from hydrophone group number 2 along streamer cable number 1 will be recorded. In this manner, all traces from the 288 hydrophone groups along streamer cable number 1 will be recorded. It should be understood that the data for hydrophone group number 2 was received at the same time as the data for hydrophone group number 1, but is recorded at storage locations following the data for hydrophone group 1.

As depicted in FIG. 6, after a trace 608 from hydrophone group number 288 along streamer cable number 1 is recorded, the sequencing process will shift to streamer cable number 2 and will next record a trace 610 originating from hydrophone group number 1 along streamer cable number 2. When all 288 traces from the hydrophone groups along streamer cable number 2 are recorded, recording of traces will resume beginning with hydrophone group number 1 along streamer cable number 3. In this manner, the traces from all hydrophone groups along all five streamer cables are recorded in trace sequential order. It will be appreciated by one skilled in the art that the total number of traces recorded from one shot is simply the product of the number of hydrophone groups along each streamer cable and the number of streamer cables. Because the number of floating point values for each trace is known and because the number of traces for each shot is known, the total number of floating point values recorded per shot is also known.

The sequencing process will resume by recording traces resulting from shot number 2 (the shot second in time). As FIG. 6 illustrates, a first trace 612 resulting from the second shot (originating from hydrophone group number 1 along streamer cable number 1) will be appended to the last trace 614 recorded from shot number 1 (that generated by hydrophone group number 288 along streamer cable number 5). All traces generated by all hydrophone groups in response to the second shot will be recorded, as described above, in hydrophone group and streamer cable order. When all traces for shot number 2 have been recorded, the sequencing process will resume by appending a first trace 614 for shot number 3 to the last trace recorded for shot number 2. In this manner, all traces will be recorded for all shots comprising an exploratory mission. It will be appreciated that a multiplicity of recording tapes or other storage media will be required to record all the data from a single mission.

Trace sequential ordering thus comprises a sequence of 32-bit floating point numbers arranged by hydrophone group number (1 to 288), then by streamer cable number (1 to 5), and then by shot number (1 to n). No marker or header data is inserted between any trace in the entire data set. Thus, it will be understood that the shot number, streamer cable number and hydrophone group number for any individual datum can be calculated knowing only the sequential position number of the datum. It will also be understood that the dimensional relationships (time, shifts in time, space, and shifts in space) are preserved within and can be reconstructed from recorded seismic data in trace sequential order. The data recorded in this manner can thus be provided to a seismic analysis system and analyzed to obtain a representation of the underlying geophysical structure.

Figure 7:
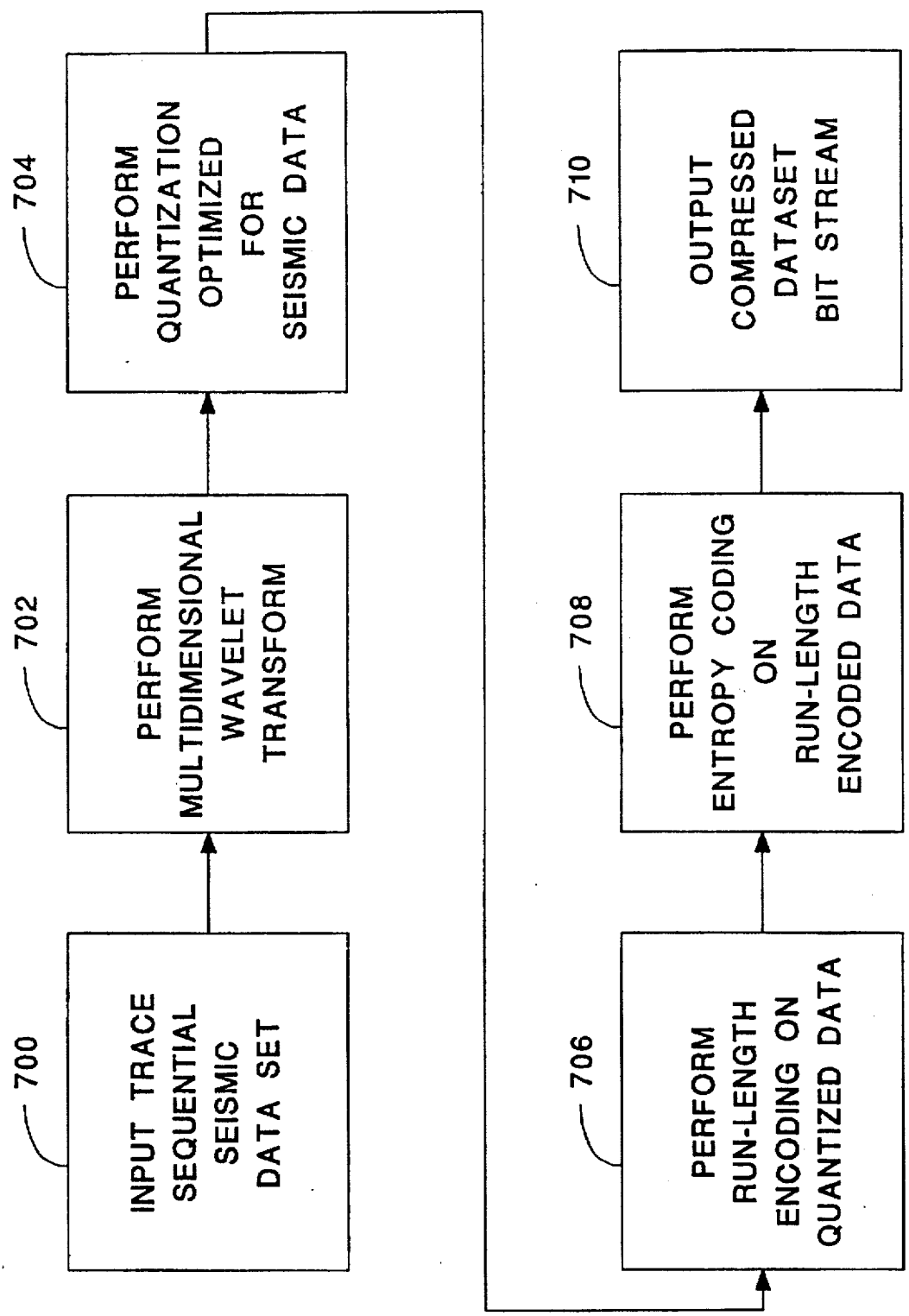
FIG. 7 illustrates a flow diagram of the data compression steps of the present invention.

FIG. 7 illustrates a pictorial representation of steps involved in practicing the compression component of the present invention. A first compression step 700 in the present invention is to identify a seismic data set upon which operations will be performed to achieve compression. The best results for the present invention are obtained by performing certain known preliminary operations upon the data prior to compression such as, for example, programmed gain, move-out, or other processing techniques to improve statistical stationarity. The present invention may be practiced, however, using data upon which no preliminary operations have been performed. Further, the data need not be sequenced in trace sequential order, but must, however, be maintained in a known order to preserve dimensional relationships among traces.

A second compression step 702 indicated by FIG. 7 illustrates the application of a multidimensional wavelet transform (described in detail below) to the input data set. As a result of the multidimensional wavelet transform, the data set is reordered according to frequency components called "subbands." The multidimensional wavelet transform causes no loss or distortion of information in the data set. One skilled in the art will appreciate that the multidimensional wavelet transform is "lossless" in that the original data set can be fully reconstructed by an inverse multidimensional wavelet transform performed upon the "transformed" data set.

A third compression step 704 depicted in FIG. 7 is quantization (described in detail below) of the transformed data set. It will be appreciated that quantization refers to the process of assigning zero or small integer values to relatively unimportant data while storing important data at higher levels of precision. The quantization step of the present invention causes a loss of certain information in the data set. The quantization algorithm of the present invention is, however, optimized for seismic data and, thus, will minimize the loss of geophysically important data.

A fourth compression step 706 illustrated in FIG. 7 represents the application of run-length encoding to a quantized data set. One skilled in the art will appreciate that run-length encoding (described briefly below) is a known process which compresses strings of repeating values.

A fifth compression step 708 described pictorially in FIG. 7 is the application of entropy coding to the run-length compressed data set. It will be readily apparent to one skilled in the art that entropy encoding (described briefly below) involves representing frequently occurring data with fewer bits than less frequently occurring data.

A sixth (last) compression step 710 illustrated in FIG. 7 is the production of a compressed bit stream appropriate for storage.

Run-length encoding and entropy coding (step four 706 and step five 708 as illustrated in FIG. 7) accomplish actual reduction in size of a data set. Both run-length encoding and entropy coding are well known in the art. The application of a multidimensional wavelet transform and optimized quantization, however, (steps two 702 and three 704 as illustrated in FIG. 7) greatly increase the compression ratio of run-length encoding and entropy coding.

Figure 8:
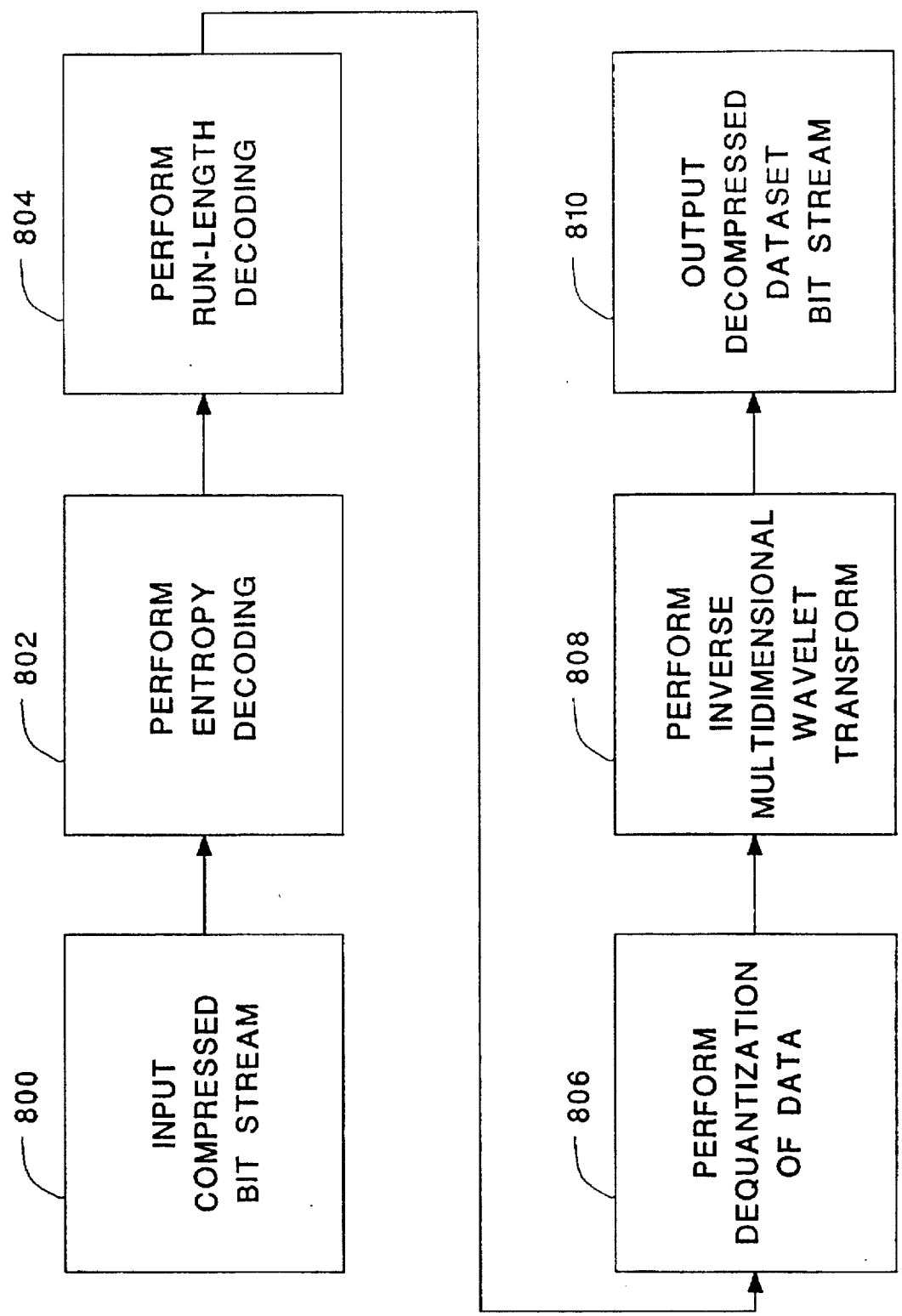
FIG. 8 illustrates a flow diagram of the data decompression steps of the present invention.

FIG. 8 illustrates a pictorial representation of the steps involved in practicing the decompression component of the present invention. The steps represented in FIG. 8 comprise a full reversal of the compression steps represented in FIG. 7 and described above.

A first decompression step 800 illustrated in FIG. 8 is the identification of a compressed bit stream produced by application of the compression steps represented in FIG. 7.

A second decompression step 802 depicted in FIG. 8 is entropy decoding. It will be apparent to one skilled in the art that entropy decoding (described briefly below) involves expansion of sub-byte representations of frequently occurring values in a data stream.

A third decompression step 804 pictorially represented in FIG. 8 is run-length decoding. It will be understood that run-length decoding (described briefly below) restores repeating values into a stream of data which were previously removed by run-length encoding.

A fourth decompression step 806 illustrated in FIG. 8 is de-quantization of the values in a data set. One skilled in the art will appreciate that de-quantization will introduce noise into the data set by replacing integer-coded representations of original floating point values with floating point approximations of the original floating point values. However, the optimized quantization of the present invention will concentrate the introduction of noise into subbands carrying little geophysically important data.

A fifth decompression step 808 pictorially represented in FIG. 8 is inverse multidimensional wavelet transform. Inverse multidimensional wavelet transform will reorder data from subband-based ordering to trace sequential ordering.

A sixth (last) decompression step 810 shown by FIG. 8 represents the production of a decompressed data set appropriate for storage or input to a geophysical analysis, or other system. It will be understood that when preprocessing such as, for example, programmed gain or move-out, is performed on a seismic data set it may be desirable to reverse such processing. Reversible preprocessing techniques applicable to seismic data are outside the scope of the present invention and will not be discussed further herein.

As disclosed in the second compression step 702 in FIG. 7 and in the fifth decompression step 808 in FIG. 8, the present invention includes a multidimensional wavelet transform and an inverse multidimensional wavelet transform.

It is well known that wavelet transforms can be used to divide signal data into frequency components (subbands) and then used to study each subband. (Daubechies 1992). The process of utilizing a wavelet transform to decompose data into subbands is referred to as an "analysis" process. The reverse process of reconstructing decomposed data into its original, full frequency form is called a "synthesis" process. Lossless, or "perfect" reconstruction of decomposed data is made possible by employing selected wavelet filter banks, one set of filter banks for the "analysis" or decomposition of data and another, different set of filter banks for the "synthesis" or reconstruction of data. The present invention utilizes two such sets of wavelet transform filter banks, one set for analysis, the other set for synthesis.

The wavelet transform filter banks utilized by the present invention are known in the art as linear phase finite impulse response (FIR) filters which correspond to a regular biorthogonal wavelet basis. (See, for example, J. Bradley, C. Brislawn, and T. Hopper, "WSQ Gray-Scale Fingerprint Image Compression Specification," IAFIS-IC-0110v2, Fed. Bureau of Invest., p. 11, Feb. 1993). The present invention applies discrete wavelet transform filter banks according to a symmetric wavelet transform algorithm also known in the art. (Christopher M. Brislawn, "Classification of Symmetric Wavelet Transforms," Los Alamos National Laboratory, Mar. 22, 1993). It will be readily apparent to one skilled in the art that the practice of the present invention is not limited to a single set of analysis and synthesis wavelet transform filter banks; rather, the present invention can be practiced utilizing any set of analysis and synthesis wavelet transform filter banks that operate together by application of an appropriate wavelet transform algorithm to achieve subband decomposition and perfect reconstruction.

Figures 9, 10:
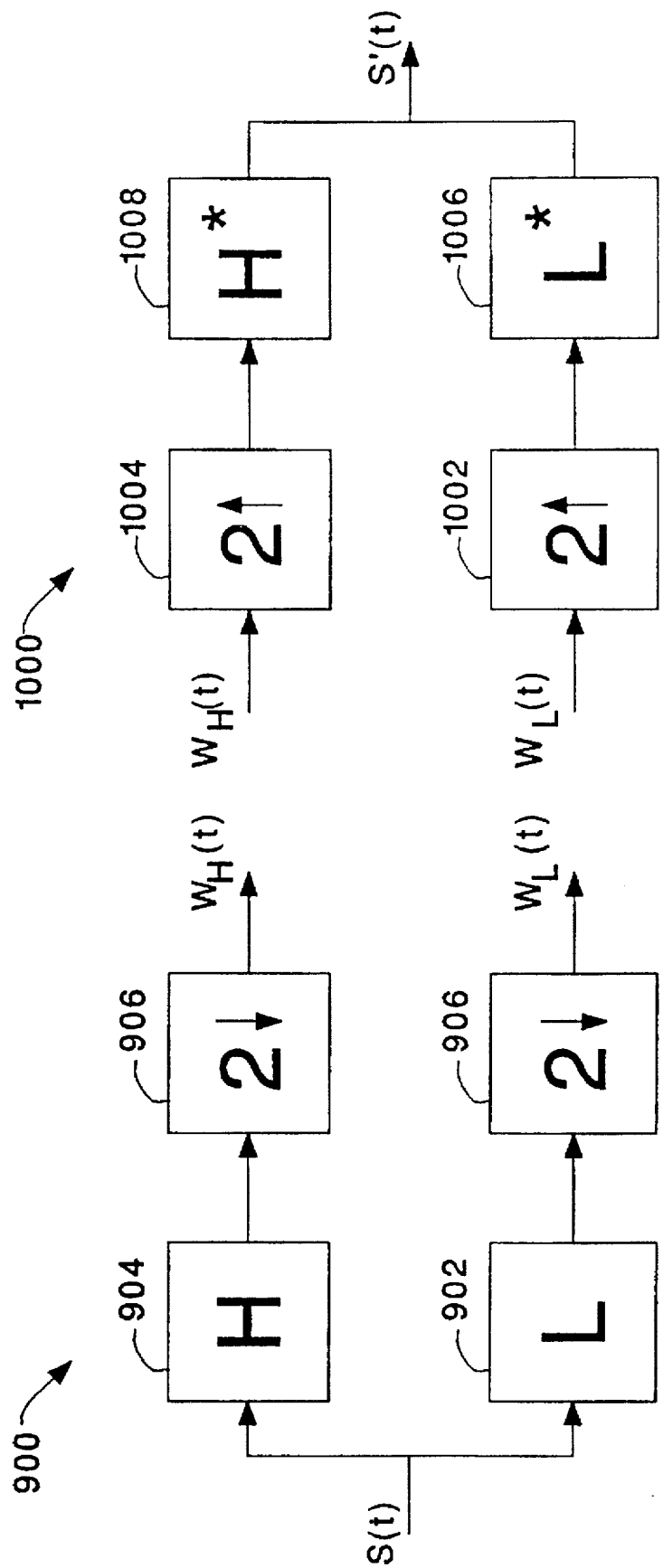
FIG. 9 illustrates a high level block diagram of a wavelet transformation filter (subband coder) used in the present invention.
FIG. 10 illustrates a high level block diagram of a inverse wavelet transformer (subband decoder) used in the present invention.

FIGS. 9 and 10 illustrate a diagrammatic representation of a perfect reconstruction subband coder comprising an "analysis" component 900 shown in FIG. 9 and a "synthesis" component 1000 shown in FIG. 10. In FIG. 9, the analysis component 900 of the subband coder utilizes wavelet transform filter banks as described above. The analysis component 900 comprises a low pass analysis filter 902 and a high pass analysis filter 904.

In the preferred embodiment, the low pass filter 902 is a whole-sample symmetric perfect reconstruction quadrature mirror filter (WSS PR QMF) having nine impulse response taps in accordance with the following transfer function:

$$H_0(z) = \sum_{n=0}^{8} h_0(n) z^{-n}$$

Similarly, the high pass filter 904 is a WSS PR QMF having 7 impulse taps in accordance with the following transfer function:

$$H_1(z) = \sum_{n=0}^{6} h_1(n) z^{-n}$$

Such an analysis component 900 decomposes signal data (S(t)) into a low frequency subband ($W_L$) and a high frequency subband ($W_H$). It will be understood that the data so decomposed will yield two resulting data streams, a low frequency subband data stream and a high frequency subband data stream. Thus, an entire data set so decomposed will yield two resulting data sets, a low frequency data set and a high frequency data set, comprising twice as many data as the original data set.

The properties, however, of the symmetric wavelet transform algorithm employed by the present invention, are such that perfect reconstruction may be accomplished even though every odd datum in both the low frequency data set and the high frequency data set is discarded. This reduction of information in signal data is referred to as "decimation." The present invention utilizes a known decimation technique called "downsampling." (See, for example, Brislawn, 1993). The particular downsampling used in the present invention preserves every data sample occurring at integer multiples of two, or in other words, discards every odd data sample. FIG. 9 illustrates a downsampling process 906 which receives and decimates the output of the low pass analysis filter 902 and generates the low frequency subband output $W_L$. FIG. 9 further illustrates a second downsampling process 908 which receives and decimates the output of the high pass analysis filter 904 and generates the high frequency subband output $W_H$.

It will be appreciated that by discarding every odd datum generated by the low pass filter 902 and by the high pass filter 904, the total number of data stored in the low pass and high pass data sets combined will be the same as the number of data in the original data set, and perfect reconstruction of the original data set can be accomplished. The use of perfect reconstruction subband coders based on wavelet transforms is known in the art. (See, for example, Jonathan N. Bradley and Christopher M. Brislawn, "The FBI Wavelet/Scalar Quantization Standard for gray-scale fingerprint image compression", SPIE Proceedings, Vol. 1961, pp. 293–304, April 1993).

FIG. 10 illustrates a diagrammatic representation of the "synthesis" component 1000 of the perfect reconstruction subband coder. The synthesis component 1000 comprises a first interpolator or upsampler 1002 which receives the low frequency subband data $W_L$ generated by the analysis component 900 which has been transmitted to the synthesis component 1000 or which has been reconstructed as described below in connection with the present invention. Similarly, a second interpolator or upsampler 1004 receives the high frequency subband data $W_H$ generated by the analysis component 900. The output of the first upsampler 1002 is provided as an input to a low pass synthesis filter 1006, and the output of the second upsampler 1004 is provides as an input to high pass synthesis filter 1008. The outputs of the two synthesis filters 1006, 1008 are added together in an adder 1010, and the sum is provided as the reconstructed output S'(t) of the synthesis component 1000. Similarly, and a high pass synthesis filter 1008. It will be understood that the synthesis filters of the present invention operate to reverse the effects of the analysis filters (900, 902) of FIG. 9 and will thereby achieve perfect reconstruction.

In the preferred embodiment, the low pass synthesis filter 1006 has the transfer function:

$$F_0(z) = -z^{-1} H_1(-z)$$

where $H_1$ is defined as described above.

Similarly, the high pass synthesis filter 1008 has the transfer function:

$$F_1(z) = z^{-1} H_0(-z)$$

where $H_0$ is defined as described above.

More information regarding the analysis filters 902, 904 and the synthesis filters 1006, 1008 can be found, for example, in the above-cited "Classification of Symmetric Wavelet Transforms," by Brislawn. (See also the above-cited "Adapted Wavelet Analysis From Theory To Software," by Wickerhauser).

The present invention relies on the fact that most geophysically interesting data in a seismic data set are low frequency and low wavenumber data. Thus, one skilled in the art will appreciate that the subband coder of FIG. 9 can be used to isolate the lower frequency components of a seismic data set and, in doing so, will extract most of the geophysically interesting data and concentrate it into a smaller data set. It will be further appreciated that this low frequency data set can itself be input into the subband coder of FIG. 9 resulting in two new and smaller data sets, one comprising the lower frequency component and the other comprising the higher frequency component of the original low frequency data set.

Seismic data, generally, is oversampled (i.e., sampled more frequently than necessary to record seismic horizons of interest). Wavelet transforms work well to take advantage of this oversampling by facilitating retention of interesting seismic events in a smaller amount of data, thus avoiding the disadvantages of employing a reduced sampling frequency. It is known in the art that iterative application of the subband coder of FIG. 9 can concentrate low frequency data into smaller and smaller data sets. (See, for example, Bradley, Brislawn and Hopper, 1993).

Figure 11:
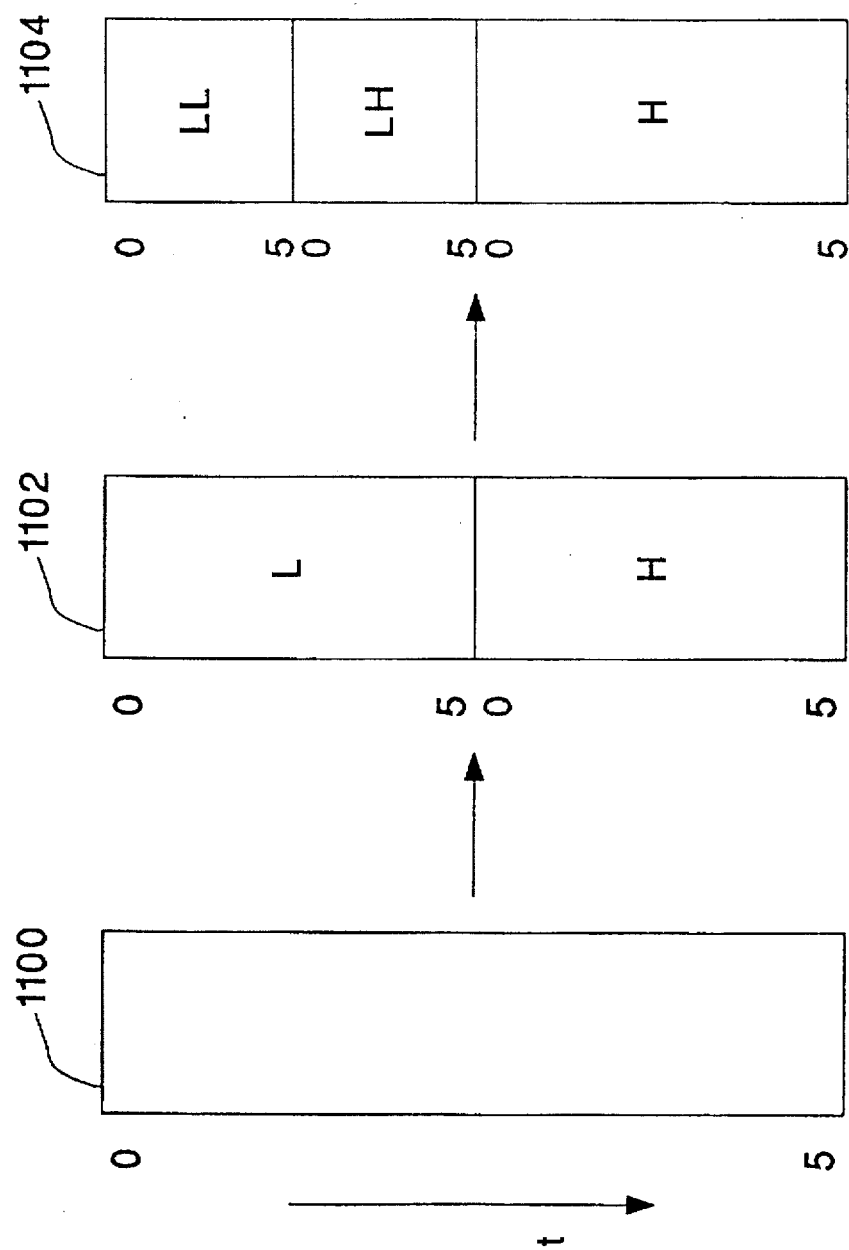
FIG. 11 illustrates a pictorial representation of a one-dimensional (1-D) wavelet transformation of the data in a single trace to generate high and low subbands, and showing the iterative application of the subband coder to the data in the lowest subbands.

FIG. 11 illustrates a pictorial representation of a trace 1100 of seismic data sampled over a 7-second recording period, a first decomposition 1102 of the trace 1100 into a low frequency component subband and high frequency component subband, and a second decomposition 1104 of the previous low frequency component subband into a low-low frequency component subband and a low-high frequency component subband. The first decomposition subband 1102 shown in FIG. 11 is obtained by applying the subband coder of FIG. 9 to the seismic trace 1100. The second decomposition subband 1104 shown in FIG. 11 is obtained by applying the subband coder of FIG. 9 to just the low frequency component subband obtained from the prior decomposition 1102. Further iterations of subband coding (not shown) will obtain component subbands isolating smaller and smaller subbands of the data from the original seismic trace 1100. It will be understood that, regardless of the number of iterations of subband coding, any resulting component subband comprises transformations of data sampled over the full 7-second recording period.

Figure 12C:
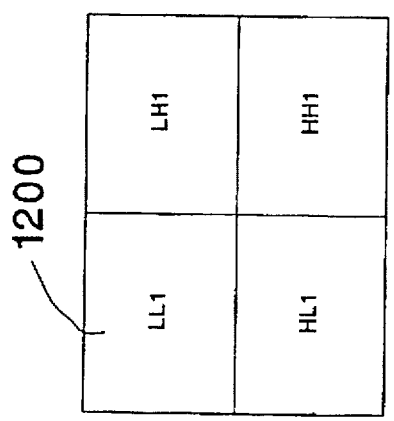
FIG. 12 illustrates a pictorial representation of a two-dimensional (2-D) wavelet transformation of the data from plural traces of a single streamer in a single shot to generate high and low subbands, and showing the iterative application of the subband coder to the data in the lowest subbands.
Figure 12F:
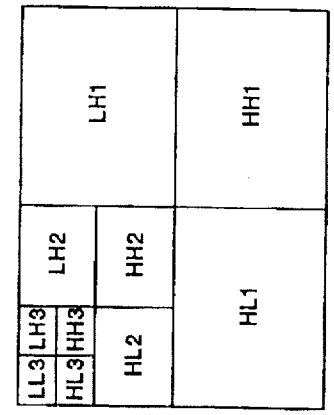
Figure 12B:
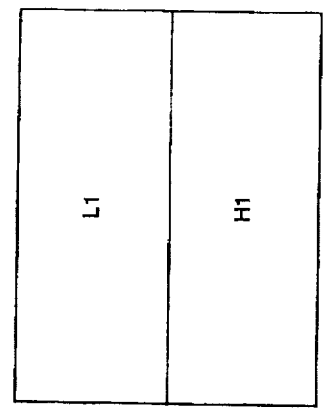

FIGS. 12a–12f illustrates a pictorial representation of an iterative application of a subband coder, such as that illustrated in FIG. 9 and described above, to a seismic data set depicted in FIG. 12a in which a time relationship and a spatial relationship have been preserved. FIG. 12b depicts a first resulting data set obtained by applying the subband coder to time-related data in the seismic data set of FIG. 12a (i.e., by applying the wavelet transform in the vertical direction in FIG. 12b). The first resulting data set (FIG. 12b) thus will comprise two groups of data organized by subband, one group representing low frequency data ("L1" in FIG. 12b), the other group representing high frequency data ("H1" in FIG. 12b).

Figure 12E:
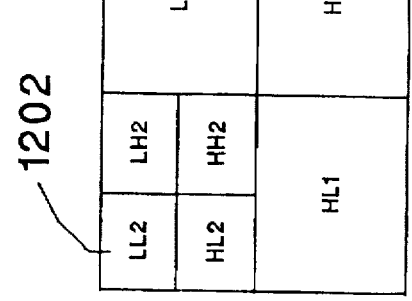
Figure 12A:
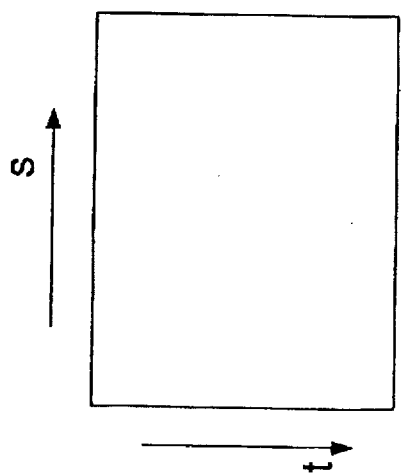

Next, a second resulting data set (FIG. 12c) is obtained by applying the subband coder to spatially-related data in the seismic data set shown in FIG. 12a (i.e., by applying the wavelet transform in the horizontal direction in FIG. 12c). The second resulting data set (FIG. 12c) will comprise four groups of data obtained by another subband separation of each of the two groups of the first resulting data set (FIG. 12b). One skilled in the art will appreciate that after applying the subband coder first according to time relationships between the original data and second according to spatial relationships between the original data, the second resulting data set will contain four groups of data organized by subband. It will be further appreciated that, of the four groups of data comprising the second resulting data set in FIG. 12c, a first group ("HH1") will consist of high frequency data along the time dimension and high frequency data along the spatial dimension, a second group ("HL1") will consist of high frequency data along the time dimension and low frequency data along the spatial dimension, a third group ("LH1") will consist of low frequency data along the time dimension and high frequency data along the spatial dimension, and a fourth group 1200 ("LL1") will consist of low frequency data along the time dimension and low frequency data along the spatial dimension. The subband organization of the second resulting data set is pictorially represented in quadrant form in FIG. 12c.

Application of a subband coder across two relationships (dimensions) preserved in a data set, first across one dimension and then across the second, is known to the art and has been referred to as a "two-dimensional wavelet transform." (See, for example, the above-cited "The FBI Wavelet/Scalar Quantization Standard for gray-scale fingerprint image compression", by Bradley and Brislawn). As discussed above, low frequency data in a seismic data set contains most of the important, geophysically interesting data. Accordingly, of the four groups of data obtained in the second resulting data set, the LL1 group 1200 contains the most important data, and the three remaining groups contain relatively unimportant data.

It is desirable for compression purposes to precisely preserve the most important data in a data set and to avoid precise preservation of unimportant data. The LL1 data group 1200 of the second resulting data set of FIG. 12c, while containing much important data, also contains large amounts of relatively unimportant data. To further isolate the most important, geophysically interesting data of the seismic data set, it is desirable to further subdivide the LL1 data 1200 to derive a smaller group of important lower frequency data so that remaining data in the LL1 group can be treated as unimportant.

Figure 12D:
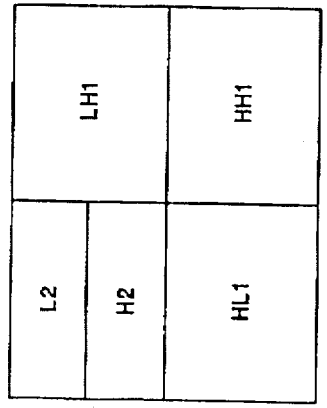

As illustrated in FIGS. 12d and 12e respectively, a third and a fourth resulting data set can be obtained by applying the subband coder to the data in the LL1 data group 1200 (FIG. 12c). The subband coder will be applied to the LL1 data along a time relationship to obtain the third resulting data set (FIG. 12d). The third resulting data set will comprise a separation of LL1 data into high and low frequency components, H2 and L2, respectively (see FIG. 12d).

The subband coder will next be applied to LL1 data along a spatial relationship to obtain the fourth resulting data set (FIG. 12e). It will be appreciated by one skilled in the art that this second iterative application of the subband coder along both time and spatial relationships of data within the LL1 group 1200 will yield four subgroupings of data distinguished by narrower subbands. Of these four subgroupings of data, a first subgroup HH2 will comprise the higher frequency components along both the time and spatial relationships, a second subgroup HL2 will comprise higher frequency components along the time relationship and lower frequency components along the spatial relationship, a third subgroup LH2 will comprise lower frequency components along the time relationship and higher frequency components along the space relationship, and a fourth subgroup LL2 1202 will comprise lower frequency components along both time and space relationships (see FIG. 12e). It will be understood that among these four subgroups of data, the most important, geophysically interesting data will be contained in subgroup LL2 1202 which contains the lowest frequency components of the data isolated thus far.

FIG. 12f depicts a fifth resulting data set obtained by a third iterative application of the subband coder to data in subgroup LL2 1202. Similar to the first and second iterative applications of the subband coder described above, the third iterative application involves a wavelet transform across time-related data and next across spatially-related data. The third iterative application of the subband coder (i.e., a horizontal and vertical application of the wavelet transform) separates data in the LL2 subband into four narrower subband categories (i.e., HH3, HL3, LH3 and LL3 as shown in FIG. 12f). One addition iteration in both the time and spatial dimensions results in a data set depicted in FIG. 13. It will be understood that by selecting the lowest frequency data set for each iteration of the wavelet transform, the most important data (i.e., the data having the most significant information content) will be concentrated in the upper leftmost subband (the quadrant labeled LL4 in FIG. 13).

Figure 13:
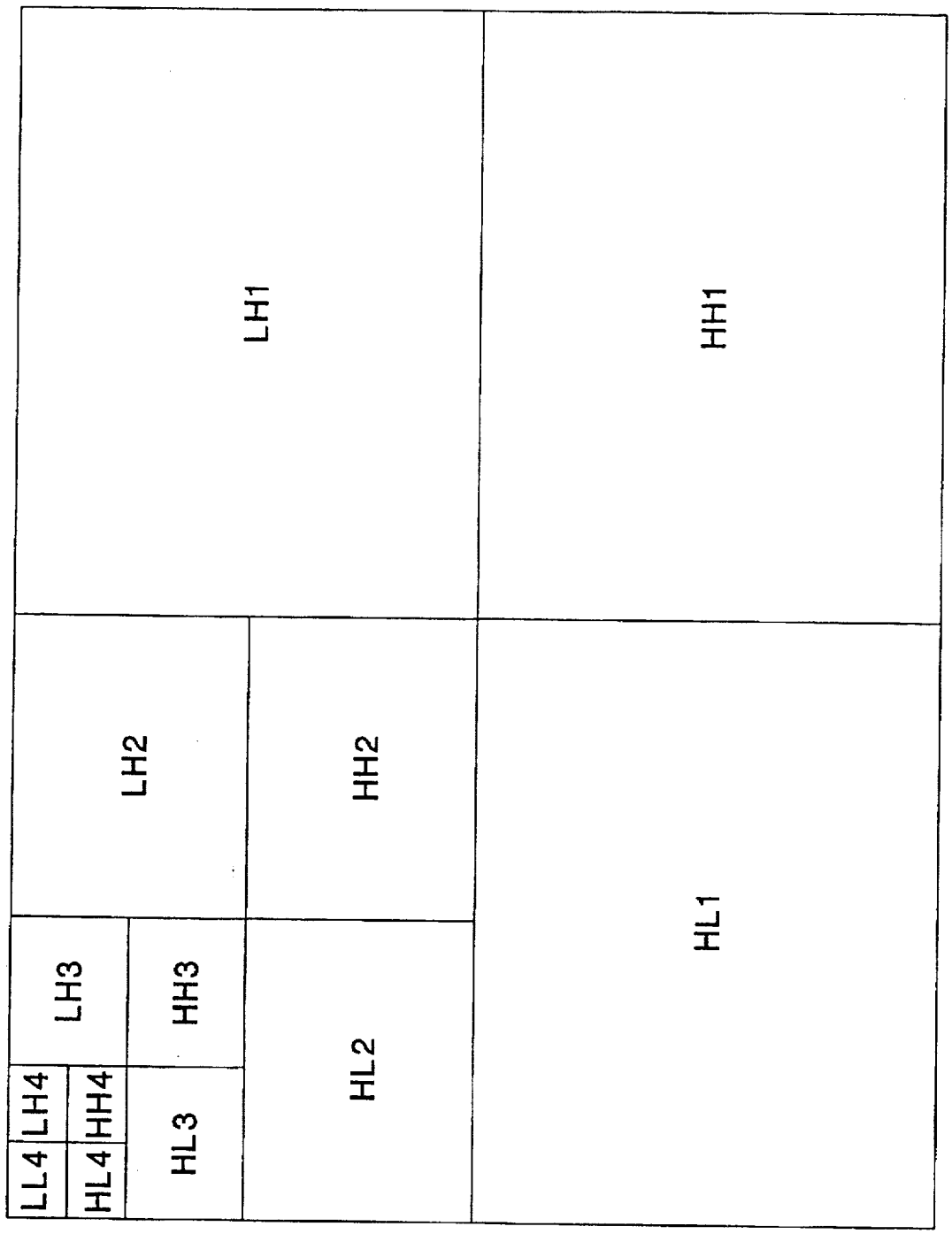
FIG. 13 illustrates a pictorial representation of the results of the wavelet transformation of FIG. 12.
Figure 14:
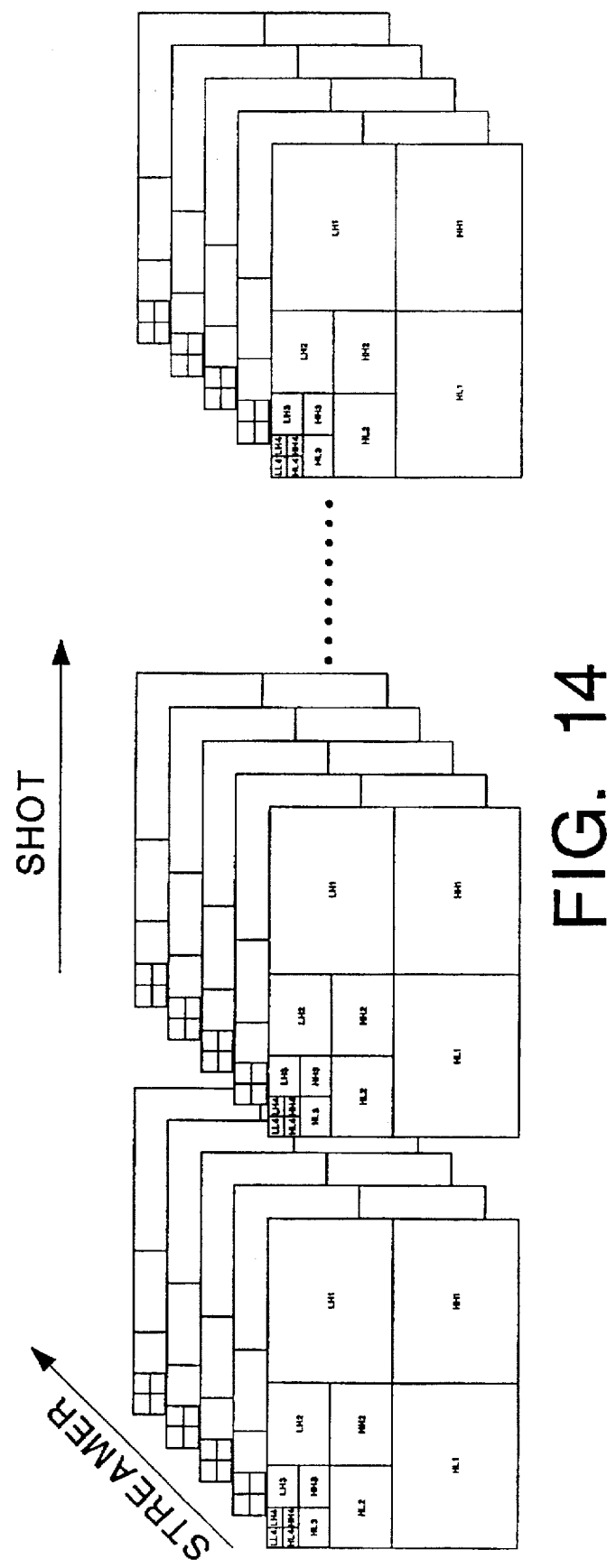
FIG. 14 illustrates the generation of the data sets of FIG. 13 for each streamer and for each shot.

It will be understood that a data set in accordance with FIG. 13 will be generated for each streamer for each shot. This is pictorially illustrated in FIG. 14 where a data set 1400 is from the first streamer of the first shot and data sets 1402, 1404, 1406 and 1408 are from the second, third, fourth and fifth streamer of the first shot. Further data sets, such as, for example, data sets 1410, 1412, 1414, 1416 and 1418, are from the second shot, and so on.

Figure 15:
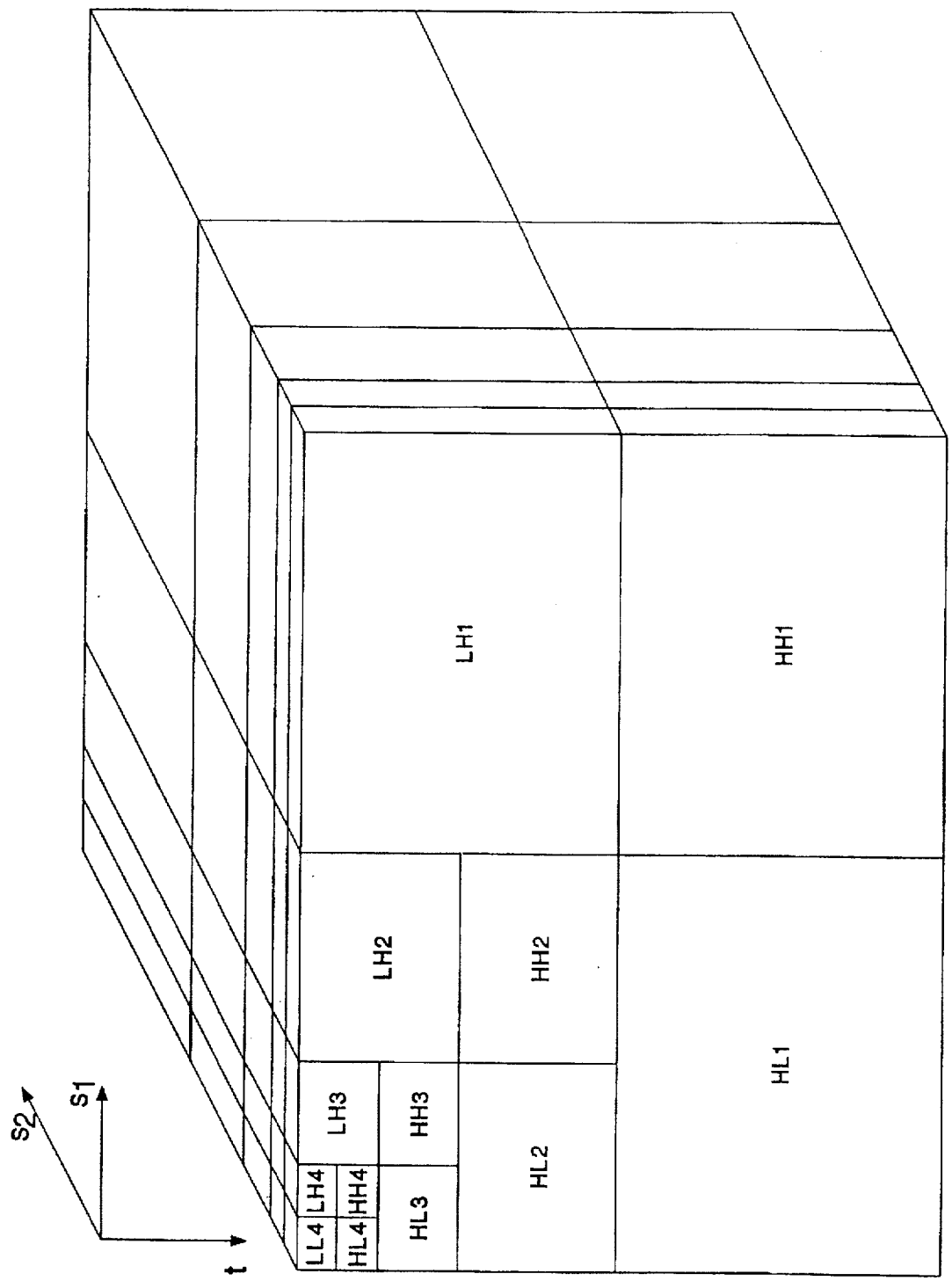
FIG. 15 illustrates a pictorial representation of the results of a one-dimensional transformation of the results of the two-dimensional transformations of plural streamers as illustrated in FIG. 13.

In the present invention, after generating the two-dimensional wavelet transformed data for each streamer and for all shots (or after retrieving such data from storage), the subband coder is then applied in a third dimension, which, in the preferred embodiment, is in the direction "across" the streamer planes for a single shot. The data set resulting from multiple iterations of the wavelet transform in the third dimension is illustrated in FIG. 15. Note that the lowest frequency components resulting from applying the subband coder to the two-dimensional data set in the third dimension lie closer to the "front" of the data set in FIG. 15.

After applying the subband coder to the two-dimensional data sets in each shot, the resulting three-dimensional data sets illustrated in FIG. 15 for each shot are then transformed in a fourth dimension which represents the spatial relationship between each shot. That is, the subband coder is applied in the shot direction in FIG. 14. Multiple iterations of wavelet transformation are applied by the subband coder to again group the data into subbands. No attempt will be made to illustrate such a transformation on paper; however, one skilled in the art can readily envision the resulting data in a four-dimensional matrix, or the like, in a data storage system.

It should be understood that the four-dimensional wavelet transformation described in FIGS. 12–15 can be performed in different orders and in different combinations. The above-described transformation can be considered as a 2D×1D×1D transformation. That is, the first transformation was performed by applying the subband coder in an interleaved sequence over the first dimension (acoustic return time) and the second dimension (direction along the hydrophone streamers). Thereafter, the second transformation was applied in a single dimension across the streamers. The third transformation was applied in a single dimension from shot-to-shot. It is also possible to complete the transformation in the first dimension before applying the subband coder in the second dimension. This would result in a 1D×1D× 1D×1D transformation. One skilled in the art will understand that other combinations of transforms and different orders of transforms can also be used as long as the corresponding order of inverse transformations is used.

The above-described steps result in the original quantity of data which has been transformed such that the more important data (i.e., the data having values which are geophysically significant) are generally grouped into fewer values. No reduction in the quantity of data has yet occurred, nor has there been a loss in the resolution of the data. Wavelet transformation results in a concise representation of significant seismic events using relatively few wavelet coefficients (few data values). Wavelet coefficients representing significant seismic events have high values, while wavelet coefficients representing data of less importance have lower values, often near zero.

After undergoing a multidimensional wavelet transform, a typical seismic data set will have fewer high-value data (generally the more important data) and more low-value data near zero (generally the less important data) without any loss in resolution. Such a representation of a seismic data set facilitates efficient preservation of important seismic events as well as low precision approximation of less important seismic data. In order to reduce data storage requirements, data transmission requirements or both requirements, the data generated by the above-described steps is quantized in accordance with another aspect of the present invention described below in connection with FIGS. 16 and 17.

The first step in the quantization process utilized by the present invention is re-ordering of the transformed data set resulting from wavelet transformation. The re-ordering process produces a data set wherein data are sequentially ordered by subband, and subbands are ordered by their respective concentrations of geophysically important data. Thus, after re-ordering is complete, the entire data set will be sequenced beginning with all the data in the subband with the lowest frequency and ending with all the data in the subband with the highest frequency.

Figures 16A, 16B:
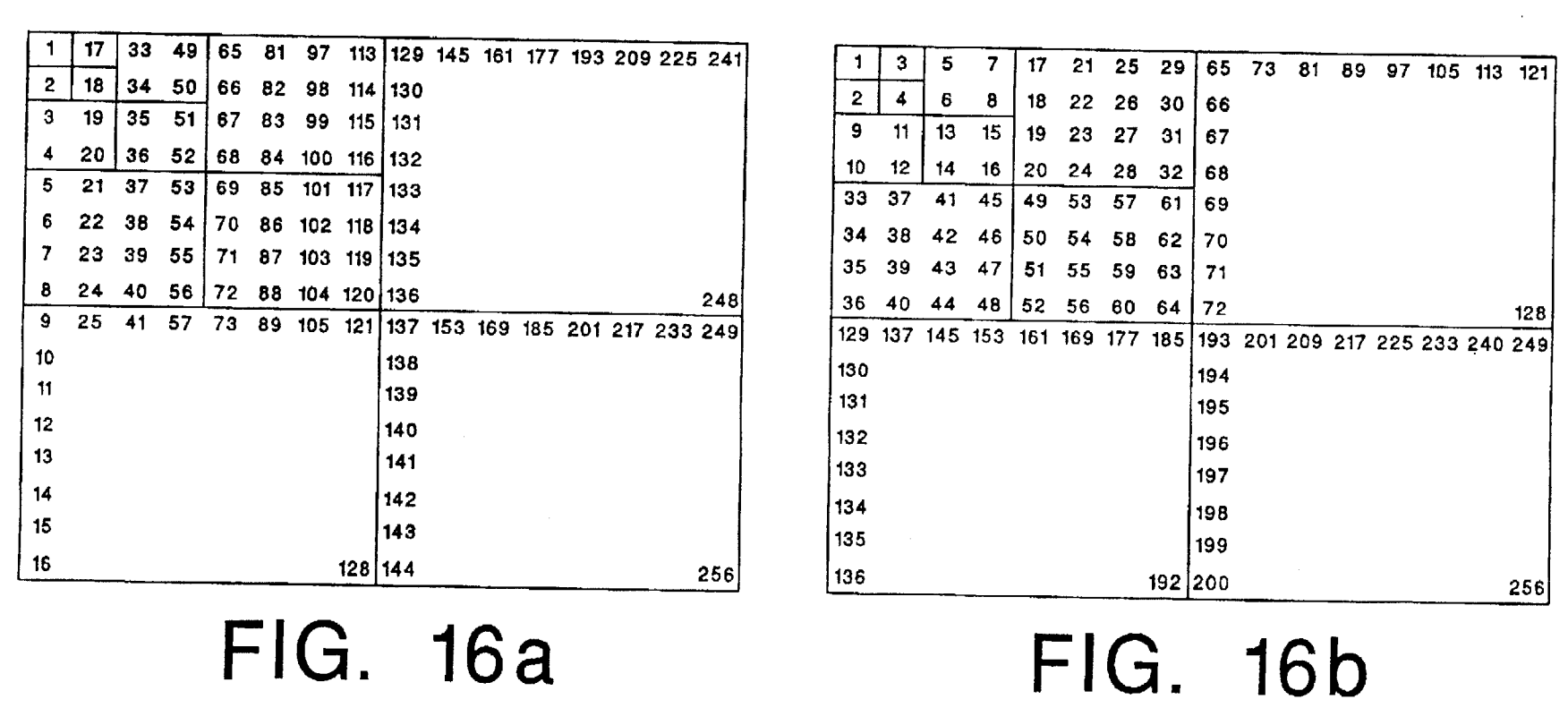

FIG. 16a illustrates pictorially a highly simplified mapping of two-dimensionally transformed subband data within logical storage locations in a computer storage media. It can be seen that the data within any subband do not occupy contiguous physical storage locations in the computer storage media. FIG. 16b illustrates a highly simplified mapping of subband data within physical storage locations after subband re-ordering. The present invention preferably performs a physical re-ordering of data into subband order. It will be appreciated that re-ordering can be accomplished logically in an alternative implementation of the present invention by sorting data without physically moving them. In other words, indices of physical computer storage locations could be kept and maintained such that data could be accessed sequentially by subband. Thus, whether physical or logical re-ordering is used, data within each subband are logically grouped together and the subbands themselves are ordered from the lowest frequency subband to the highest frequency subband.

Scalar quantization, generally, refers to a process of identifying a number of contiguous value ranges within a data set of floating point data sufficient to accommodate all data values within the data set, assigning integer values to each value range, and then replacing each datum with an integer corresponding to the value range in which the datum's value was found. Quantization requires a selection of the size of each value range, or "bin." One skilled in the art will appreciate that selection of a small "quantization bin size" will facilitate preservation of fine fluctuations in the values within a data set but will require more storage, while selection of a larger quantization bin size will result in preservation of coarser fluctuations in the values within a data set but will require less storage (i.e., greater compression). Thus, a trade-off must be made between resolution and compression. As discussed below, each datum in the re-ordered data set will be assigned to a bin so that each datum can be identified by an integer representing the magnitude of the datum.

A second step in the quantization process of the present invention selects a scale factor which affects the quantization "master step size" (discussed below). The preferred embodiment of the present invention involves selection of the scale factor by a user of the present invention in accordance with the resolution versus compression trade-off discussed above. It will be understood, however, that the present invention may be practiced using other methods of scale factor selection such as, for example, an automated algorithmic selection. Because the scale factor directly affects the master step size, which in turn, as discussed below, is used to determine the quantization bin sizes, it will be appreciated that the compression ratio achieved by the present invention will vary according to the value of the scale factor. For example, during one application of the present invention to a seismic data set, a scale factor of 0.35 resulted in a compression ratio of 60:1, while a scale factor of 0.5 resulted in a compression ratio of 90:1.

A third step in the quantization process of the present invention computes a "master step size." To compute the master step size, the squares of all signals comprised in the seismic data set are added together then averaged to produce an average signal value (i.e., a root mean square, or "RMS" value). This RMS value is then multiplied by the scale factor discussed above to compute the master step size. The quantization bin sizes established for each subband are initially equated to the master step size and may (as discussed below) be adjusted to maximize or minimize the resolution preserved in a subband depending on the concentration of geophysically significant information in the subband.

A fourth step in the quantization process of the present invention adjusts the quantization bin size for each subband in the data set. The quantization bin size for each subband is adjusted based on a relative weighting. Weighting of each subband is based on the expected concentration of geophysically important data. Generally, subbands are weighted in order of importance, from lowest frequency (most important) to highest frequency (least important) along all dimensions which were subjected to wavelet transform. The weighting factor will become smaller (i.e., degrade) in the direction of higher frequency in each dimension. Less degradation occurs, however, from subband to subband along the time dimension than that which occurs from subband to subband along the spatial dimensions. In other words, more important seismic information is expected in subbands having a high-frequency component along the time dimension than with respect to subbands having high-frequency components along any spatial dimension. Thus, the degradation in weighting from subband to subband along the time dimension is more gradual than the degradation in importance from subband to subband along the spatial dimensions.

The relative weighting of subbands results in decreased bin size for subbands of data containing greater concentrations of geophysically significant data and increased bin size for subbands containing lesser concentrations of geophysically significant data. Referring to FIG. 15, the subbands along dimension "t" are very gradually reduced in weight (given slightly increasing bin sizes with increased frequency), while subbands running along dimensions "S1" and "S2" are reduced more dramatically in weight (bin sizes are increased more rapidly as the spatial frequency increases).

A fifth step in the quantization process of the present invention maximizes the bit usage to represent data in each subband. As discussed above, the number of quantization bins differs from subband to subband in accordance with the desired resolution for the subband. The number of binary bits in a digital computer system required to represent the highest bin number will also differ from subband to subband. It is desirable for compression purposes to minimize the number of bits required to represent the number of quantization bins in a subband. The number of quantization bins allocated for each subband is related to a power of two. For example, 5 bits will uniquely identify 32 bins. If the data values encountered in a subband comprise a value range smaller than the range embodied by all quantization bins combined, then a scale factor is computed such that the highest and lowest values in the subband will fall into the highest and lowest quantization bins. One skilled in the art will appreciate that such an adjustment to the data values in a subband will result in maximizing the retained resolution for the subband without requiring additional space.

A sixth step in the quantization process of the present invention establishes a "zero bin width" for each subband. It will be understood that the "zero bin" comprises a range of floating point data values, which, for compression purposes, the quantization process will treat as zero. In other words, any datum in a subband having a value which falls within that subband's zero bin width value range will be treated as zero (i.e., will be assigned an integer value of zero to cause it to be "placed" in the zero bin). The quantization process adjusts the zero bin width of each subband to maximize the number of data that can be treated as zero without losing geophysically significant data.

Figure 17A:
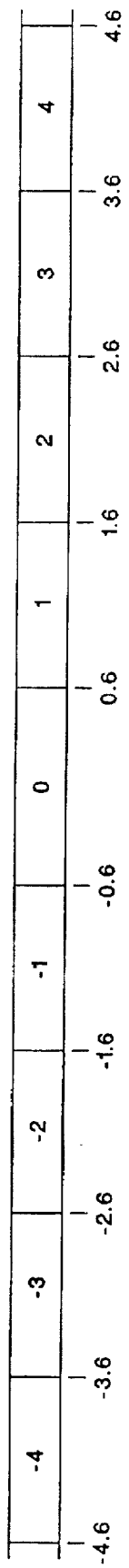
FIG. 17 illustrates a pictorial representation of a sample subband for which normalized quantization bin value ranges have been computed as well as a sample subband for which adjusted quantization bin value ranges have been computed.

In the preferred embodiment of the present invention, the zero bin width is selected for each subband to have a normalized width of 1.2 and remaining bins have normalized widths of 1.0. The bin widths are multiplied by the subband step size to establish the quantization bin widths. For example, if the subband step size has a value of 1, the zero bin width will have an absolute value of 1.2 extending from −0.6 to +0.6. Each of the other bin widths will have absolute values of 1.0. Thus, as illustrated in FIG. 17a, for an example subband, any datum having an absolute value greater than −0.6 and less than 0.6 will be represented by a 0; any datum having a value greater than 0.6 and less than 1.6 will be represented by a 1, and so forth. Similarly, any datum having a value less than −0.6 and greater than −1.6 will be represented by a -1, and so on.

Figure 17B:
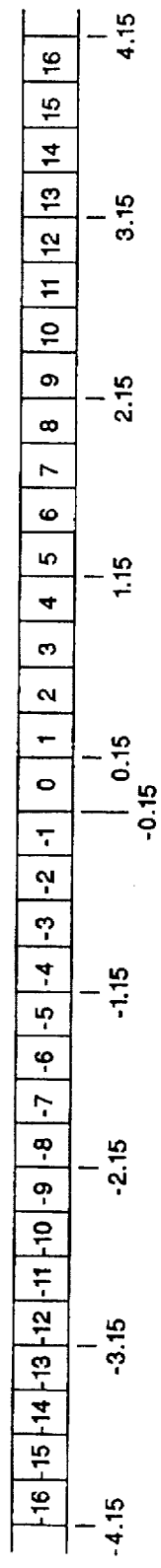

It can be seen that by multiplying the normalized bin width by smaller subband step sizes, the bin widths are decreased accordingly. For example, if the subband step size is selected to be 0.25, then, as illustrated in FIG. 17b, the zero bin extends from −0.15 to +0.15, the +1 bin extends from +0.15 to +0.40, and so on. It can therefore be seen that the resolution is greater; however more bins are required to represent the same range of data.

A seventh (last) step in the quantization process of the present invention replaces each data value in the entire seismic data set with an integer equivalent to produce an integer stream representation of the seismic data set. This is done subband-by-subband according to the re-ordering step discussed above. The second through sixth quantization steps have established and adjusted the quantization bins for each subband. Each data value in every subband (in subband order) is replaced with an integer, the replacement integer being selected according to the quantization bin (value range) within which the data value is found.

Although described above in connection with the preferred scalar quantization process, other quantization processes, such as for example, known vector quantization processes may also be used.

The above quantization process itself achieves some compression of data because multiple-byte floating point numbers are replaced by integer bin values. The quantization process also unifies and orders wavelet transformed data in a seismic data set to maximize the compression ratio obtained by applying known data compression algorithms. The most important aspect of the quantization process is that it results in a large number of zeros in the quantized data. Furthermore, because of the data re-ordering described above, the zeros occur in clusters such that a large number of the zeros occur in sequence. As a result, when conventional run-length encoding is applied to the quantized data, very high compression ratios are achieved. Thus, in the present invention, the quantization step is followed by a step of run-length encoding the quantized data by inputting the resulting integer stream representation of a seismic data set into the run-length encoding process 706 (FIG. 7).

The run-length encoding process 706 is preferably a conventional encoding process and will not be described in detail herein. (See, for example, Mark Nelson, "The Data Compression Book," M&T Books, ISBN 1-55851-214-4, 1992.) Basically, when a plurality of zeros occur in sequence without intervening non-zero values, the zeros in the stream are replaced with an escape code followed by an integer value representing the number of zeros in the string. Thus, a large number of zero bytes can be replaced by a few bytes. By re-ordering and quantizing the data, as described above, the number of zero bytes is increased significantly and are stored in long strings such that the run-length encoding process can achieve an overall compression ratio of approximately 50:1 when the user selects a scale factor of approximately 0.5 or larger.

Following the run-length encoding process, the compressed, byte-oriented representation of a seismic data set is input into the entropy coding process 708 (FIG. 7). Entropy coding is well-known to the art and will not be described in detail herein. For example, one well-known entropy coding process is conventional Huffman coding. (See "A Method For The Construction Of Minimum Redundancy Codes," David A. Huffman, *Proceedings of the IRE*, pp. 1098–1110, 1952). Basically, rather than represent all data bytes by the same number of bits, entropy coding is based upon the recognition that certain bytes will occur more frequently than other bytes. The most frequently occurring bytes are represented by a few bits (e.g., one or two bits), and progressively less frequently occurring bytes are represented by more bits.

In the present invention, statistical analysis is performed on an initial block of data to be compressed to determine the relative number of occurrences of byte values. The block of data upon which analysis is performed typically comprises 30–40 megabytes of wavelet coefficient values quantized to integer values where each integer represents a bin number within a subband. A table is then created which assigns bit values to observed bin numbers such that the fewest bits are assigned to the most frequently occurring bin numbers and the most bits to the least frequently occurring bin numbers. Thus, the amount of binary data required to represent quantized wavelet coefficients is reduced. The foregoing method of entropy coding is known in the art. (See, for example, the above-cited "The Data Compression Book," by Nelson.)

After entropy coding, the resulting bit stream representation of a seismic data set may be stored on computer storage media such as, for example, magnetic tape or transmitted to a local or remote site using standard data communication equipment. As a result of the transformation, re-ordering, quantization and compressing steps, the data storage requirements are reduced by a factor of 100 or more, thus significantly reducing the number of magnetic tapes or other storage media required to archive the data and make the data available for analysis. Similarly, the transmission requirements are reduced. For example, a data transmission that might otherwise require 1.5 hours to transmit prior to compression by the present invention may be transmitted after compression in approximately one minute, thus making it practical to transmit the data on a "real-time" basis. For example, data from an exploratory vessel may be transmitted to a seismic analysis laboratory where it can be decompressed and analyzed. Information derived from the analysis can be used to direct additional acoustic mapping by the vessel in the area where it is currently positioned.

It should be understood from the foregoing that very little additional data needs to be transmitted or stored with the compressed data. In particular, in addition to any conventional identifying information (e.g., date, location, number of hydrophones per streamer, number of streamers, number of shots per run, etc.), the only variables that need to be stored or transmitted are the user selected scale factor, the adjusted bin widths for each subband, and a "block size" value which indicates the quantity of seismic data placed into individual contiguous blocks of storage media (e.g., 9 shots per block). Note that each "block" of seismic data can be decompressed independently by the decompression component of the present invention.

Existing seismic data processing systems cannot utilize seismic data in a compressed bit stream representation such as that produced by the compression component of the present invention. It is therefore necessary to perform a decompression process (described below) which comprises, for the most part, a reversal of the compression process of the present invention.

The first decompression step is the entropy decoding process 802 (FIG. 8) applies entropy decoding to decompress a bit stream representation of a seismic data set produced by the compression component of the present invention. Entropy decoding, like entropy coding described above, is well-known to the art, and will not be described in detail. (See, for example, the above-cited "The Data Compression Book" by Nelson.) Basically, the entropy decoding process 802 converts the variable bit-length data generated by the entropy coding process 708 back to conventional byte-oriented data.

The second decompression step applies the run-length decoding process 804 (FIG. 8) to the byte-oriented data stream from the above-described entropy decoding process 802. The run-length decoding process 804 is well-known and will not be described in detail herein. (See, for example, the above-cited "The Data Compression Book" by Nelson.) Basically, the run-length decoding process 804 identifies the escape codes added by the run-length encoding process 706 and substitutes the appropriate number of zeros for the escape codes and the accompanying integer value. The run-length decoding process 804 thus outputs a stream of integers which represent the bin numbers described above in connection with the quantization process 704 (FIG. 7).

The third decompression step applies the dequantization process 806 which dequantizes the byte-oriented integer data stream output by the run-length decoding process 804 described above. The integer data will be arranged in subband order, having previously been so arranged by the quantization process 704 of the compression component of the present invention (see FIG. 7).

The dequantization process 704 replaces the integer data in each subband with floating point numbers that approximate the original pre-quantization floating point numbers of the subband. The value of each integer datum indicates a particular quantization bin (or floating point value range) within the subband associated with the integer datum. Because an original floating point number having a value within the value range of this quantization bin is no longer known, an approximated floating point number (i.e., a floating point number representing the center of the quantization bin value range) is selected to most accurately restore the original floating point number.

The preferred embodiment of the present invention selects the center floating point value of a quantization bin value range to replace integer data. If, for example, the integer −2 appears in the input stream, and the associated quantization bin has a value range of −1.6 to −2.6, the dequantization process would select −2.1 as an approximate replacement (noting that the value of the original floating point number could have been any value between −1.6 and −2.6). Likewise, for example, if the integer 3 appears in the input stream, and the associated quantization bin has a value range of 2.6 to 3.6, the dequantization process would select 3.1 to replace the integer 3. It will be understood that the present invention can be practiced using alternative methods for choosing values within quantization bin value ranges to replace integers and thereby approximate original floating point values in a seismic data set.

The approximation of original floating point values in the dequantization process of the present invention introduces noise within the seismic data set. However, because the data in subbands containing the highest concentration of geophysically significant data were quantized at a much higher precision (i.e., were represented using a higher number of bits) than data in subbands carrying little geophysically significant data, noise is introduced primarily within data of little geophysical significance.

After all integer values are replaced with floating point values, the dequantization process reverses the subband ordering step of the quantization process. This reverse ordering obtains a data set wherein subband data is dispersed into noncontiguous logical storage locations in computer storage media in precise agreement with the data ordering obtained from the multidimensional wavelet transform performed on the original seismic data set. Thus, following the reverse ordering process, the data will be ordered as illustrated in FIG. 16a.

The last step in the decompression component of the present invention is the application of an inverse multidimensional wavelet transform process 808 in FIG. 8. The inverse multidimensional wavelet transform applies the synthesis component 1000 of the subband coder illustrated in FIG. 10. The synthesis component 1000 of the subband coder utilizes wavelet transform filter banks selected specifically to perform perfect reconstruction of the wavelet transform performed by the analysis component of the subband coder during the compression process.

FIG. 18a illustrates an example or an original set of seismic traces prior to the application of the present invention to the data set representing the seismic traces. FIG. 18b illustrates a set of seismic traces which have been reconstructed from data produced by the present invention wherein the original data has been wavelet transformed, quantized and compressed as described above, stored, and then decompressed, dequantized and inverse wavelet transformed. It cart be seen that the reconstructed seismic traces accurately represent the original seismic traces. Thus, the reconstructed seismic traces can be analyzed in a conventional manner. As a further illustration of the efficacy of the present invention, FIG. 18c illustrates a set of data which represents the difference between the original data represented in FIG. 18a and the reconstructed data represented in FIG. 18b. It can be seen that the difference between the two sets of data is relatively distributed spatially and in intensity. Thus, the difference can be considered as noise rather than as a significant change in the underlying data.

The availability of large compression ratios, with acceptable noise characteristics, leads to the ability to carry out data-processing and transmission tasks that would otherwise be impractical and that promise to bring significant benefits to the seismic industry. For example, at a compression ratio of 100:1, it becomes possible to transmit a complete seismic field data set to the processing center in nearly real time during field acquisition operations. With nearly instantaneous transmission of both seismic and positioning data, enhanced quality control possibilities become possible without major personnel or equipment deployment. Even more important is the probability of a significant improvement in turnaround time from the start of acquisition to delivery of a final migrated stack.

Although described above in connection with a four-dimensional seismic data set (i.e., acoustic return time, a first spatial dimension along the streamers, a second spatial dimension from streamer to streamer, and a third spatial dimension from shot to shot), the application of wavelet transforms to additional dimensions can be envisioned. For example, a five-dimensional application of the present invention can result from additional seismic runs parallel to an initial seismic run such that the shots overlap transversely to the direction of movement of the exploratory vessel. Thus, the transformation of the previously described data across the parallel shots would be considered as a fourth spatial dimension.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A method for reducing data storage requirements for a set of seismic data collected from a plurality of seismic sensors in response to at least one seismic shot, wherein each sensor generates time-varying data which is sampled, digitized and stored, and wherein the data from said plurality of said sensors have a spatial relationship therebetween in at least two spatial dimensions, said method comprising the steps of:

applying a wavelet transform to said time-varying data in first, second and third dimensions to generate subbands of transformed data comprising wavelet coefficients which represent said time-varying data and which are organized in accordance with frequency characteristics, wherein one of said first, second and third dimensions corresponds to time, another of said first, second and third dimensions corresponds to said first spatial dimension, and the last of said first, second and third dimensions corresponds to said second spatial dimension;

scalar quantizing said subbands of wavelet coefficients, wherein wavelet coefficients are replaced by integer equivalents, each integer equivalent representing a range of values for said wavelet coefficients, said integer equivalents selected for each subband based upon the relative geophysical significance of each subband, wherein less significant subbands have fewer ranges and more significant subbands have more ranges;

compressing said replacement integer equivalents to generate a compressed seismic data set; and storing said compressed seismic data set.

2. The method as defined in claim 1, wherein said wavelet transform is further applied in a fourth dimension.

3. The method as defined in claim 2, wherein said fourth dimension corresponds to a third spatial dimension resulting from further seismic shots spatially displaced from previous seismic shots.

4. The method as defined in claim 1, wherein said scalar quantizing step comprises the steps of:

reordering said transformed data in said subbands so that data in the same subbands are accessed sequentially;

computing the RMS value of data in said transformed data set;

selecting a master step size proportional to said RMS value such that a desired compression ratio is obtained;

selecting a step size for each subband by applying a respective weight for each subband to said master step size to determine the number of bits to use for each subband;

adjusting said step size for each subband such that the maximum value in each subband corresponds to the maximum value represented by the number of bits selected for each subband;

adjusting the step size of data represented by a zero value for each subband such that subbands containing more geophysically significant data have a smaller range of values represented by a zero value and subbands containing less geophysically significant data have a larger range of values represented by a zero value; and converting each value in each subband to an integer value using said step sizes for each subband.

5. The method as defined in claim 1, wherein said compressing step comprises the steps of applying run-length encoding to said replacement integer values to generate a set of run-length encoded data, and applying entropy coding to said set of run-length encoded data to generate said compressed data set.

6. The compressed seismic data set generated by the method as defined in claim 1.

7. A method for reducing data transmission requirements for a set of seismic data collected from a plurality of seismic sensors in response to at least one seismic shot, wherein each sensor generates time-varying data which is sampled, digitized and stored, and wherein the data from said plurality of said sensors have a spatial relationship therebetween in at least two spatial dimensions, said method comprising the steps of:

applying a wavelet transform to said time-varying data in first, second and third dimensions to generate subbands of transformed data comprising wavelet coefficients which represent said time-varying data and which are organized in accordance with frequency characteristics, wherein one of said first, second and third dimensions corresponds to time, another of said first, second and third dimensions corresponds to said first spatial dimension, and the last of said first, second and third dimensions corresponds to said second spatial dimension;

scalar quantizing said subbands of wavelet coefficients, wherein wavelet coefficients are replaced by integer equivalents, each integer equivalent representing a range of values for said wavelet coefficients, said integer equivalents selected for each subband based upon the relative geophysical significance of each subband, wherein less significant subbands have fewer ranges and more significant subbands have more ranges;

compressing said replacement integer equivalents to generate a compressed seismic data set; and transmitting said compressed seismic data set.

8. The method as defined in claim 7, wherein said wavelet transform is further applied in a fourth dimension.

9. The method as defined in claim 8, wherein said fourth dimension corresponds to a third spatial dimension resulting from further seismic shots spatially displaced from previous seismic shots.

10. The method as defined in claim 7, wherein said scalar quantizing step comprises the steps of:

reordering said transformed data in said subbands so that data in the same subbands are accessed sequentially;

computing the RMS value of data in said transformed data set;

selecting a master step size proportional to said RMS value such that a desired compression ratio is obtained;

selecting a step size for each subband by applying a respective weight for each subband to said master step size to determine the number of bits to use for each subband;

adjusting said step size for each subband such that the maximum value in each subband corresponds to the maximum value represented by the number of bits selected for each subband;

adjusting the step size of data represented by a zero value for each subband such that subbands containing more geophysically significant data have a smaller range of values represented by a zero value and subbands containing less geophysically significant data have a larger range of values represented by a zero value; and converting each value in each subband to an integer value using said step sizes for each subband.

11. The method as defined in claim 7, wherein said compression of said replacement integer equivalents is accomplished by applying run-length encoding and entropy coding.

12. The compressed seismic data set generated by the method as defined in claim 7.

13. A method for reconstructing a set of seismic data from a compressed seismic data set, said method comprising the steps of:

retrieving a compressed data set resulting from applying wavelet transformation, scalar quantization, and compression to a set of seismic data generated in response to at least one seismic shot;

decompressing said compressed data set to create an uncompressed data set;

scalar dequantizing said uncompressed data set to generate a set of wavelet coefficients in trace sequential order which approximate an original set of wavelet transformed seismic data; and applying an inverse wavelet transform in at least three dimensions to said set of wavelet coefficients to generate reconstructed seismic data.

14. The method as defined in claim 13, wherein said decompression step comprises application of entropy decoding said compressed data set followed by run-length decoding to generate an uncompressed data set.

15. The method as defined in claim 13, wherein said scalar dequantizing step comprises the steps of:

replacing integer values in said uncompressed data set with floating point values to generate a wavelet transformed data set approximating an original seismic data set, said wavelet transformed data set comprising wavelet coefficients; and ordering said wavelet transformed data to create a trace sequentially ordered data set.

16. The method as defined in claim 13, wherein said inverse wavelet transform is applied in a fourth dimension.

17. The method as defined in claim 13, wherein said fourth dimension corresponds to a third spatial dimension resulting from further seismic shots spatially displaced from previous seismic shots.

18. The compressed seismic data set generated by the method as defined in claim 13.

19. A compressed seismic data set generated by the steps of:

applying a wavelet transform to a set of digital data representing seismic data in first, second and third dimensions to generate subbands of transformed data comprising wavelet coefficients which represent said seismic data and which are organized in accordance with frequency characteristics, wherein one of said first, second and third dimensions corresponds to time, another of said first, second and third dimensions corresponds to a first spatial dimension, and the last of said first, second and third dimensions corresponds to a second spatial dimension;

scalar quantizing said subbands of wavelet coefficients, wherein wavelet coefficients are replaced by integer equivalents, each integer equivalent representing a range of values for said wavelet coefficients, said integer equivalents selected for each subband based upon the relative geophysical significance of each subband, wherein less significant subbands have fewer ranges and more significant subbands have more ranges; and compressing said replacement integer equivalents to generate a compressed data set.

* * * * *